(12) United States Patent
Imamura et al.

(10) Patent No.: US 7,523,119 B2
(45) Date of Patent: Apr. 21, 2009

(54) XPATH EVALUATION AND INFORMATION PROCESSING

(75) Inventors: Takeshi Imamura, Yokoahama (JP); Akira Koseki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/815,423

(22) Filed: Apr. 1, 2004

(65) Prior Publication Data

US 2004/0261019 A1 Dec. 23, 2004

(30) Foreign Application Priority Data

Apr. 25, 2003 (JP) .............................. 2003-122292

(51) Int. Cl.
*G06F 7/00* (2006.01)
(52) U.S. Cl. ...................................... 707/101; 707/102
(58) Field of Classification Search .................. 707/101, 707/102

See application file for complete search history.

(56) References Cited

U.S. PATENT DOCUMENTS

2003/0154444 A1* 8/2003 Tozawa et al. .............. 715/513
2004/0010752 A1* 1/2004 Chan et al. .................. 715/513
2004/0068487 A1* 4/2004 Barton et al. .................. 707/3

OTHER PUBLICATIONS

Feng Peng, "XPath Queries on Streaming Data", Jun. 9-12, 2003, International Conference on Management of Data, ACM Press. pp. 431-442.*
Feng Peng, "XSQ: Streaming XPath Queries", Sep. 18, 2002, UM Computer Science Department; CS_TR_4401 UMIACS; UMIACS-TR-2002-81.*
XML Path Language (Xpath), Version 1.0 W3C Recommendation Nov. 16, 1999, by: James Clark and Steve DeRose.

* cited by examiner

Primary Examiner—John E Breene
Assistant Examiner—Thu-Nguyet Le
(74) Attorney, Agent, or Firm—Vazken Alexanian

(57) ABSTRACT

An XML parser for inputting XML event strings which constitute an XML document to be processed, and an XPath evaluating unit for executing evaluation of the XPath by streaming processing are provided. This XPath evaluating unit serially evaluates the XPath with respect to the respective XML events transferred from the XML parser, and retains information concerning a result of partial evaluation of this XPath when the XPath is partially established for a given XML event. Then, when the last step of this XPath is established, the XPath is judged as established for the XML document.

7 Claims, 30 Drawing Sheets

(A)

STEP 1　　　　　　STEP 2　　　　　STEP 3
/child::document/child::chapter/child::section (B)

(C)

```
<document>
    <title/>
    <chapter/>
    <chapter>
        <section/>
    </chapter>
</document>
```

FIG. 9
- self 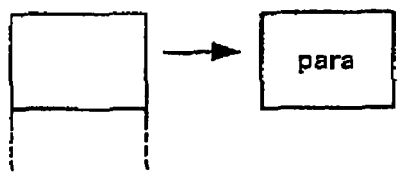
- child 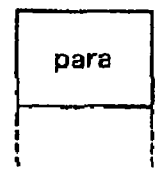
- descendant 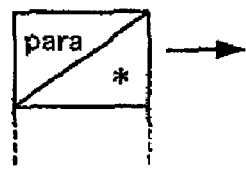
- descendant-or-self 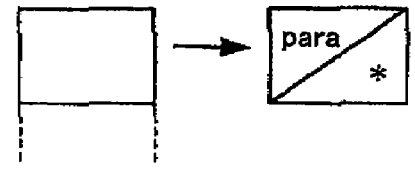
- following 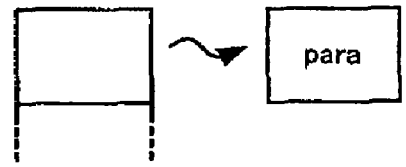
- following-sibling 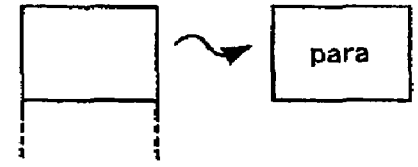
- attribute 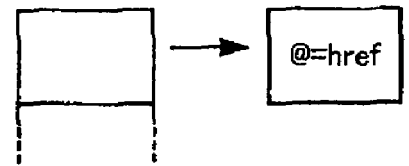
- namespace 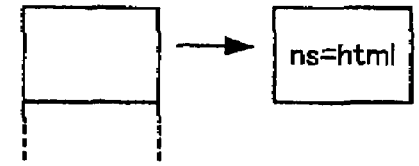

FIG.10
(1) chapter/para
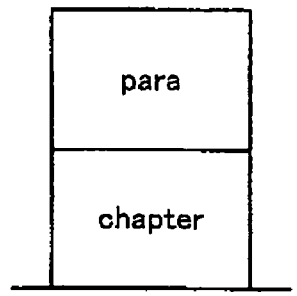
(2) chapter/para[@type="warning"]
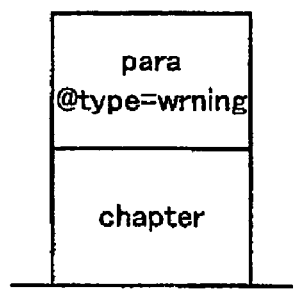
(3) chapter/para[2]
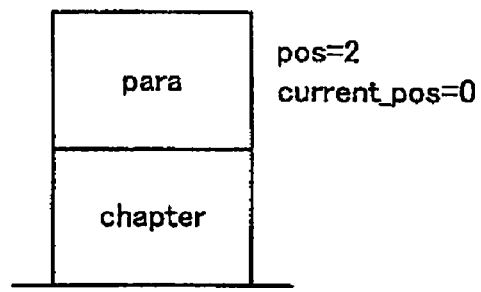
(4) .//para
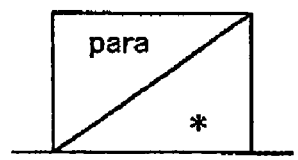

FIG.11

```
<doc>
    <chapter>
        <para>xxx</para>
    </chapter>
    <chapter>
        <para>yyy</para>
    </chapter>
<doc/>
```

FIG. 12
(A) startDocument
XML EVENT STRING STACK     STACK FOR XPath
(B) startElement: doc
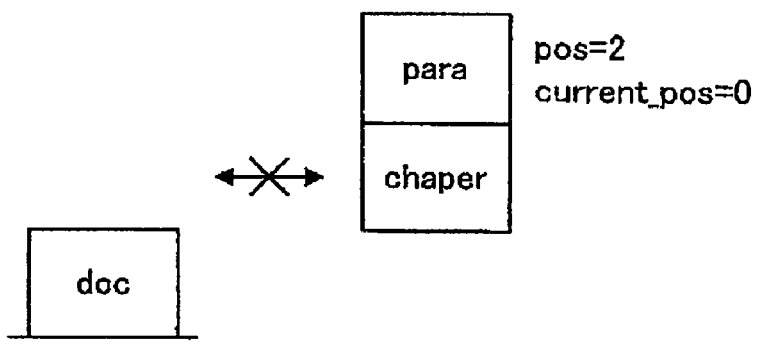
(C) startElement: chapter
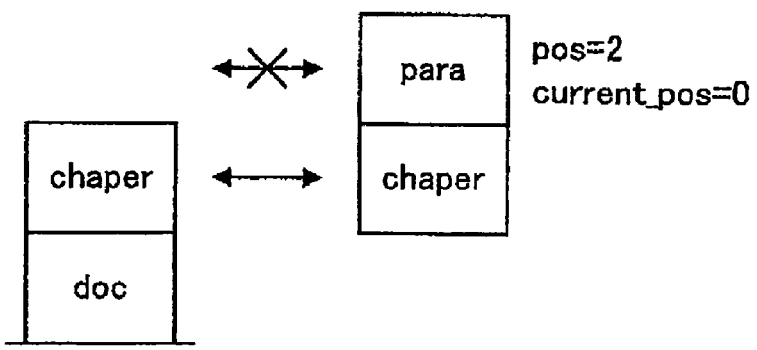

FIG. 13
(A) startElement: para
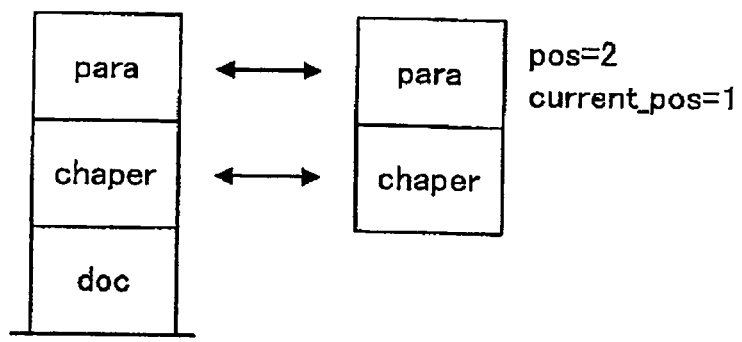
(B) endElement: para
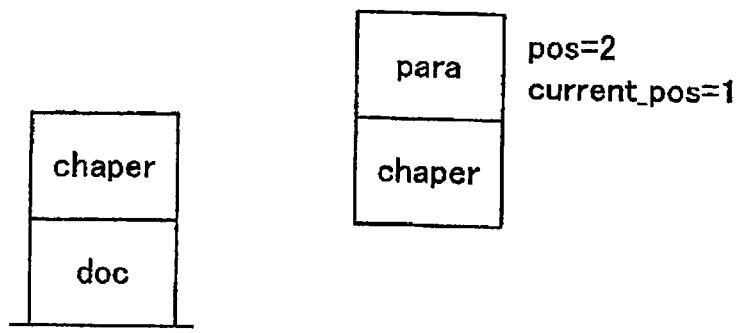
(C) endElement: chapter
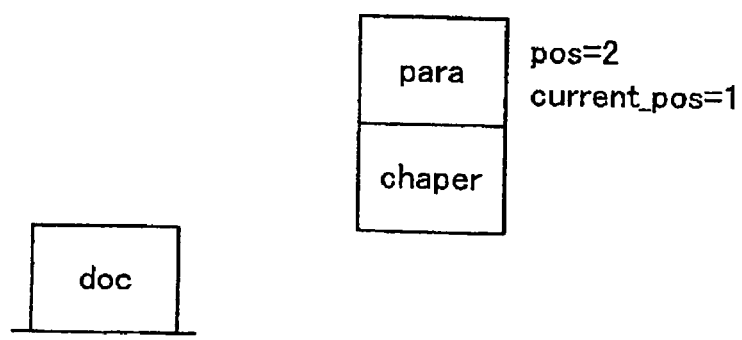

FIG.14
(A) startElement: chapter
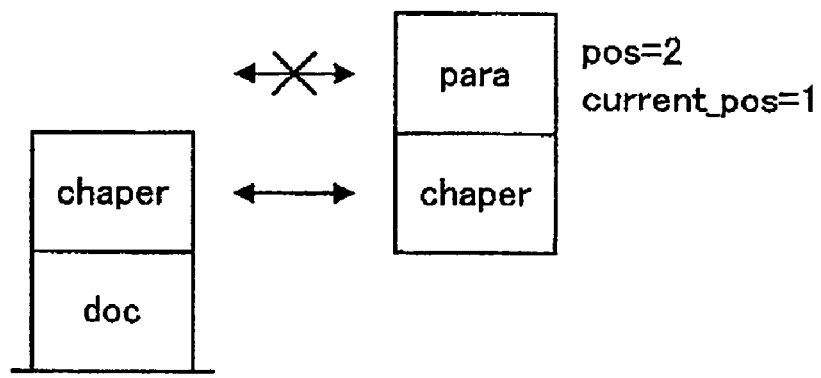
(B) startElement: para
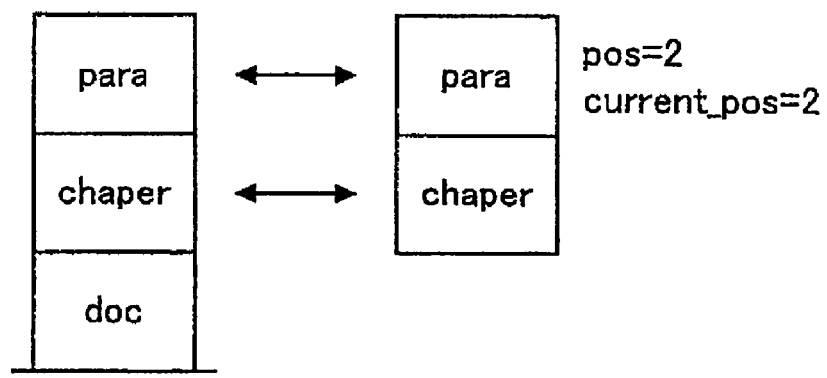

FIG. 15
```
<doc>
   <chap>
      <para num="1"/>
      <para num="2"/>
      <para num="3"/>
   </chap>
   <chap/>
</doc>
```
FIG. 16
XPath    chap/para[@num= "2"]/following-sibling::para
STACK 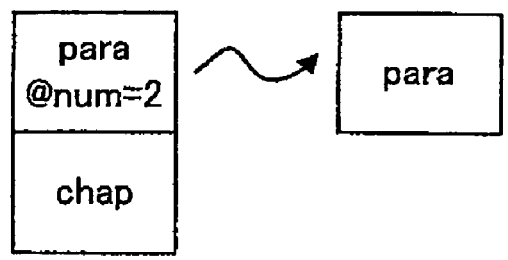

FIG.17
(A) startDocument
XML EVENT STRING STACK   STACK FOR XPath
(B) startElement: doc
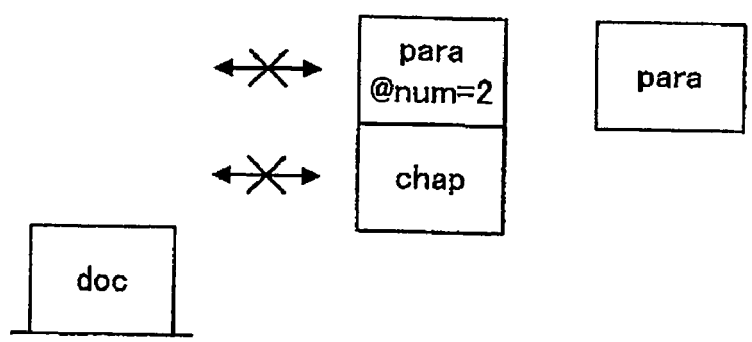
(C) startElement: chapter
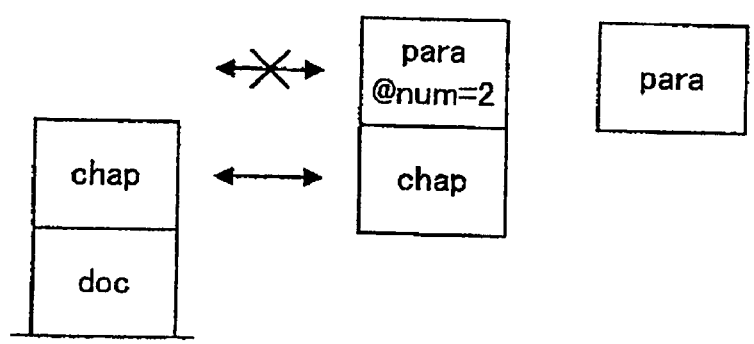

FIG. 18
(A) startElement: para, @num=1
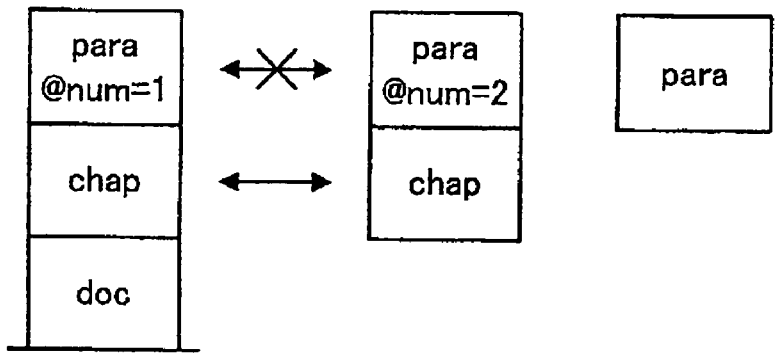
(B) endElement: para
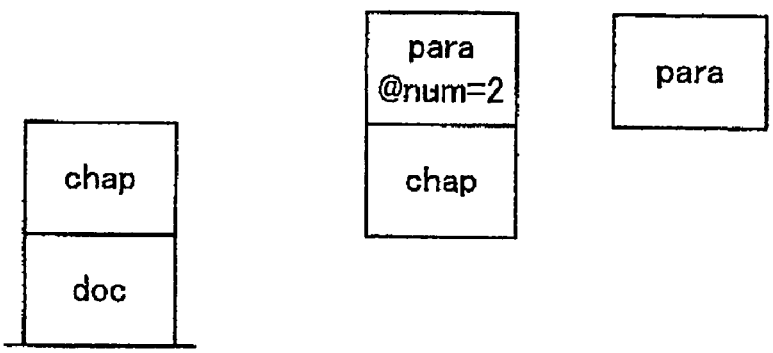
(C) startElement: para, @num=2
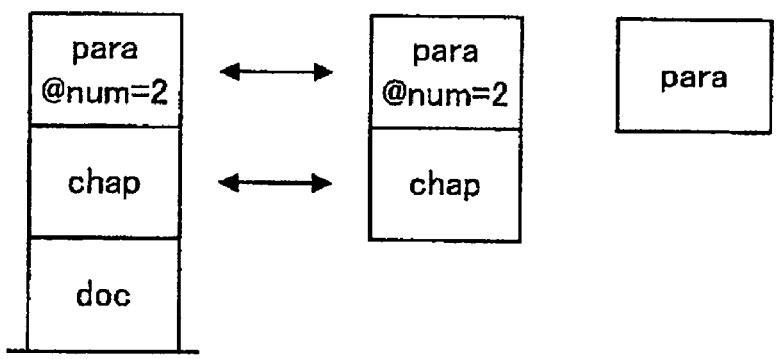

FIG.19
(A) endElement: para
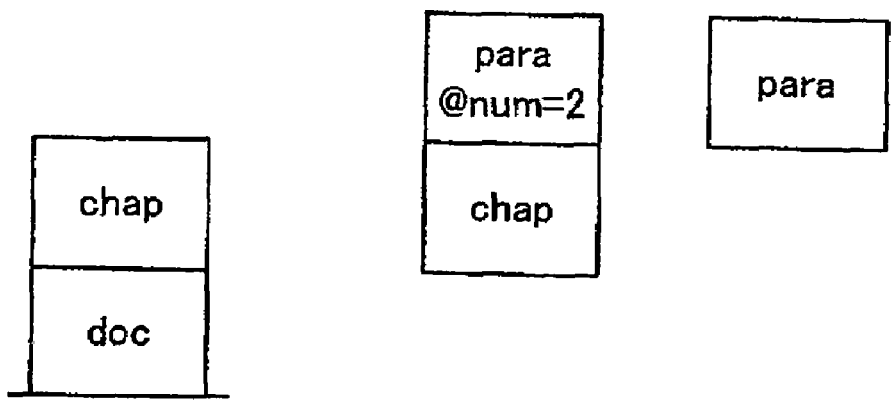
(B) startElement: para, @num=3
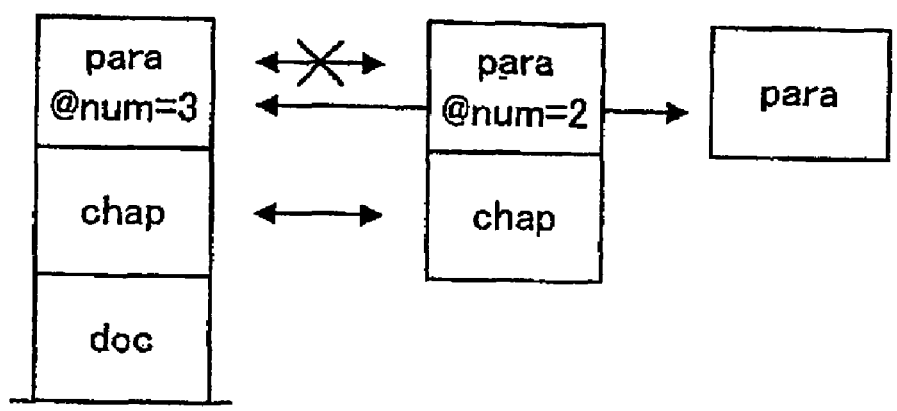

XML DOCUMENT

```
<a>
  <c/>
  <b/>
  <d/>
</a>
```

SAX EVENT STRINGS startDocument
startElement:"a"
startElement:"c"
endElement:"c"
startElement:"b"
endElement:"b"
startElement:"d"
endElement:"d"
endElement:"a"
endDocument

DOCUMENT TREE

```
 1 2       3              4
"/a/b/preceding-sibling::c/following-sibling::d"
``` startDocument

{<0, doc>}

SAX EVENT STRING    DOCUMENT TREE    SAVED SET

```
 1 2       3              4
"/a/b/preceding-sibling::c/following-sibling::d"
``` startDocument
startElement:"a"

{<0, doc>,
 <1, "a">}

SAX EVENT STRING    DOCUMENT TREE    SAVED SET

SAX EVENT STRING    DOCUMENT TREE    SAVED SET

SAX EVENT STRING    DOCUMENT TREE    SAVED SET

FIG. 31

```
|1|2|      3                    |    4                |
"/a/b/preceding-sibling::c/following-sibling::d"
``` startDocument
startElement:"a"
startElement:"c"
endElement:"c"
startElement:"b"

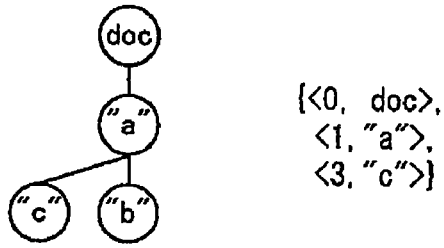

{<0, doc>,
 <1, "a">,
 <3, "c">}

SAX EVENT STRING   DOCUMENT TREE   SAVED SET

FIG. 32

```
|1|2|      3                    |    4                |
"/a/b/preceding-sibling::c/following-sibling::d"
``` startDocument
startElement:"a"
startElement:"c"
endElement:"c"
startElement:"b"
endElement:"b"

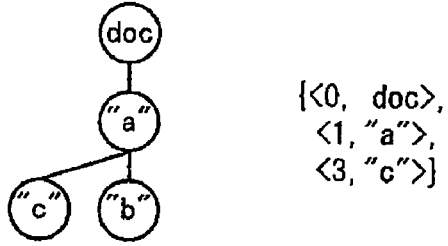

{<0, doc>,
 <1, "a">,
 <3, "c">}

SAX EVENT STRING   DOCUMENT TREE   SAVED SET

FIG. 33

```
 |1|2|     3                    4
"/a/b/preceding-sibling::c/following-sibling::d"
``` startDocument
startElement:"a"
startElement:"c"
endElement:"c"
startElement:"b"
endElement:"b"
startElement:"d"

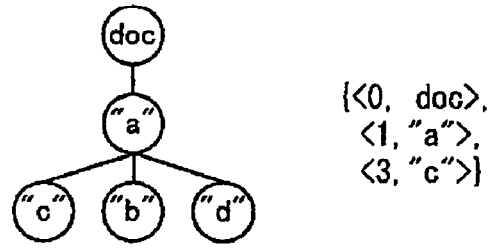

{<0, doc>,
 <1, "a">,
 <3, "c">}

SAX EVENT STRING    DOCUMENT TREE    SAVED SET

FIG. 34

```
 |1|2|     3                    4
"/a/b/preceding-sibling::c/following-sibling::d"
``` startDocument
startElement:"a"
startElement:"c"
endElement:"c"
startElement:"b"
endElement:"b"
startElement:"d"
endElement:"d"

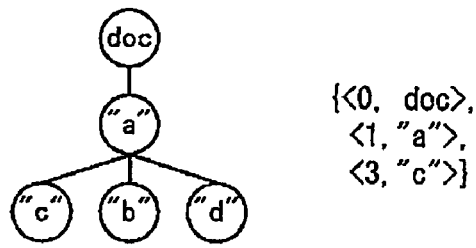

{<0, doc>,
 <1, "a">,
 <3, "c">}

SAX EVENT STRING    DOCUMENT TREE    SAVED SET

FIG. 35

```
|1|2|      3            |        4          |
"/a/b/preceding-sibling::c/following-sibling::d"
``` startDocument
startElement:"a"
startElement:"c"
endElement:"c"
startElement:"b"
endElement:"b"
startElement:"d"
endElement:"d"
endElement:"a"

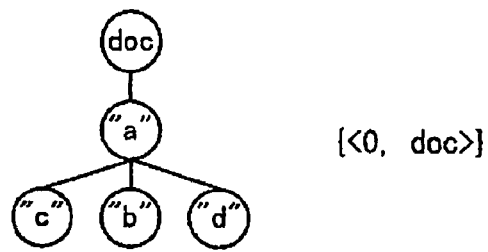

{<0, doc>}

SAX EVENT STRING    DOCUMENT TREE    SAVED SET

FIG. 36

```
|1|2|      3            |        4          |
"/a/b/preceding-sibling::c/following-sibling::d"
``` startDocument
startElement:"a"
startElement:"c"
endElement:"c"
startElement:"b"
endElement:"b"
startElement:"d"
endElement:"d"
endElement:"a"
endDocument

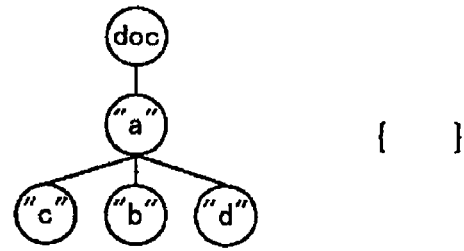

{ }

SAX EVENT STRING    DOCUMENT TREE    SAVED SET

XPATH EVALUATION AND INFORMATION PROCESSING

FIELD OF THE INVENTION

The present invention relates to a technique for analyzing an Extensible Markup Language (XML) document. More specifically, the present invention relates to an analyzing system for evaluating the XML Path Language (XPath) and an analyzing method thereof.

BACKGROUND OF THE INVENTION

The XML which can freely define a logical structure of a document and significance of a constituent is widespread today as a document description language for use in packet switching on a computer network represented by the Internet. When an XML document is used in an application program, it is necessary to analyze the XML document to be processed. The XPath is used in this event. The XPath is a language for defining a sentence which indicates a specific part of an XML document, which is the specification recommended by the World Wide Web Consortium (W3C). By use of the XPath, it is possible to analyze whether or not a given XML document includes a specific logical structure or a constituent (see Non-patent Literature 1, for example).

A structure of an XML document can be expressed by a tree structure. An XML document is expressed by use of the Document Object Model (DOM), which is the specification recommended by the W3C, or the like. When the XML document is analyzed by use of the XPath, the entire XML document expressed in the DOM or the like is usually subjected to scanning to check whether the XML document has a structure described with the XPath or not. Therefore, an analyzing system for XML documents needs to read the entire XML document to be analyzed into a given memory in order to perform processing.

As described above, when an XML document is analyzed by use of the XPath, for example XML Path Language (XPath) Version 1.0, it has been conventionally necessary to read the entire XML document to be analyzed once into a work area of a memory. However, when the data size of the XML document to be analyzed is huge, large memory usage is required to read the XML document as description of the DOM or the like. Moreover, a lot of time is required for processing of generation and operation of the DOM.

In the case of using a streaming-based application program interface (API) such as the Simple API for XML (SAX) or the Xerces Native Interface (XNI), it is inefficient that the processing can be started only after reading the entire XML document once in order to perform an analysis by use of the XPath, in spite of the fact that the API can perform serial processing of the XML document obtained in accordance with a streaming format.

SUMMARY OF THE INVENTION

In consideration of the foregoing problems, it is an aspect of the present invention to realize systems, apparatus and analyzing methods for evaluating the XPath while subjecting an XML document to streaming processing. To attain the foregoing aspect, the present invention is realized as an XPath evaluating method for evaluating the XPath relevant to an XML document by use of a computer. In an example embodiment, this XPath evaluating method comprises a first step of serially inputting XML event strings constituting an XML document to be processed, a second step of serially evaluating the XPath relevant to the respectively inputted XML events and retaining information concerning a result of partial evaluation of the XPath in given storing means when the XPath is partially established with respect to a given XML event, and a third step of repeating the partial evaluation of the XPath along with the input of the XML event strings while considering the result of the partial evaluation retained in the storing means and judging that the XPath is established with respect to the XML document to be processed when the last part of the XPath is established.

Another aspect of the present invention is realized as an XPath evaluating apparatus having the following configuration. This XPath evaluating apparatus includes an evaluation executing unit for executing evaluation of the XPath by streaming processing, and an XML event transferring unit for inputting XML event strings which constitute an XML document to be processed and serially transferring the XML event strings to the evaluation executing unit. This evaluation executing unit serially evaluates the XPath with respect to each of the XML events transferred from the XML event transferring unit and retains information concerning a result of partial evaluation of this XPath with respect to a given XML event when this XPath is partially established. Moreover, the XPath evaluating apparatus judges that the XPath is established in this XML document when the last step of this XPath is established.

Another XPath evaluating apparatus according to the present invention includes a document tree constructing unit for inputting XML event strings which constitute an XML document and serially constructing a document tree indicating a document structure of the XML document based on inputted XML events along with the input of the respective XML events, an XML event transferring unit for inputting the XML event strings which constitute the XML document to be processed and serially transferring the XML event strings to the document tree constructing unit, and an evaluation executing unit for evaluating the XPath along with construction of the document tree by this document tree constructing unit while using the document tree with a part which has been constructed.

Furthermore, the present invention can be also realized as an information processing apparatus including an XML parser, an XPath evaluating unit having a function of the above-described XPath evaluating apparatus, and an application executing unit for inputting an XML event generated by the XML parser and executing processing of an XML document configured by the inputted XML events in response to an evaluation result of the XPath by the XPath evaluating unit.

BRIEF DESCRIPTION OF THE DRAWINGS

For a more complete understanding of the present invention and the advantages thereof, reference is now made to the following description taken in conjunction with the accompanying drawings, in which:

FIG. 9 is a view exemplifying relations between types of axes and stacks generated in this embodiment;

FIG. 10 shows stacks generated by the XPath based on the relations shown in FIG. 9;

FIG. 11 shows an example of an XML document to be processed;

FIGS. 12A to 12C are views showing aspects of evaluation processing by use of stacks for the XML document of FIG. 11;

FIGS. 13A to 13C are views showing aspects of evaluation processing by use of stacks for the XML document of FIG. 11;

FIGS. 14A and 14B are views showing aspects of evaluation processing by use of stacks for the XML document of FIG. 11;

FIG. 15 shows another example of an XML document to be processed;

FIG. 16 shows the XPath to be evaluated and a stack generated from this XPath;

FIGS. 17A to 17C are views showing aspects of evaluation processing by use of stacks for the XML document of FIG. 15;

FIGS. 18A to 18C are views showing aspects of evaluation processing by use of stacks for the XML document of FIG. 15;

FIGS. 19A and 19B are views showing aspects of evaluation processing by use of stacks for the XML document of FIG. 15;

FIG. 31 shows an aspect of SAX event strings, the document tree, and transition of the saved set with respect to the XML document, which shows the aspect when a SAX event "startElement: "b"" is inputted;

FIG. 32 shows an aspect of SAX event strings, the document tree, and transition of the saved set with respect to the XML document, which shows the aspect when a SAX event "endElement: "b"" is inputted;

FIG. 33 shows an aspect of SAX event strings, the document tree, and transition of the saved set with respect to the XML document, which shows the aspect when a SAX event "startElement: "d"" is inputted;

FIG. 34 shows an aspect of SAX event strings, the document tree, and transition of the saved set with respect to the XML document, which shows the aspect when a SAX event "endElement: "d"" is inputted;

FIG. 35 shows an aspect of SAX event strings, the document tree, and transition of the saved set with respect to the XML document, which shows the aspect when a SAX event "endElement: "a"" is inputted;

FIG. 36 shows an aspect of SAX event strings, the document tree, and transition of the saved set with respect to the XML document, which shows the aspect when a SAX event "endDocument" is inputted.

DESCRIPTION OF THE INVENTION

Figure 1:
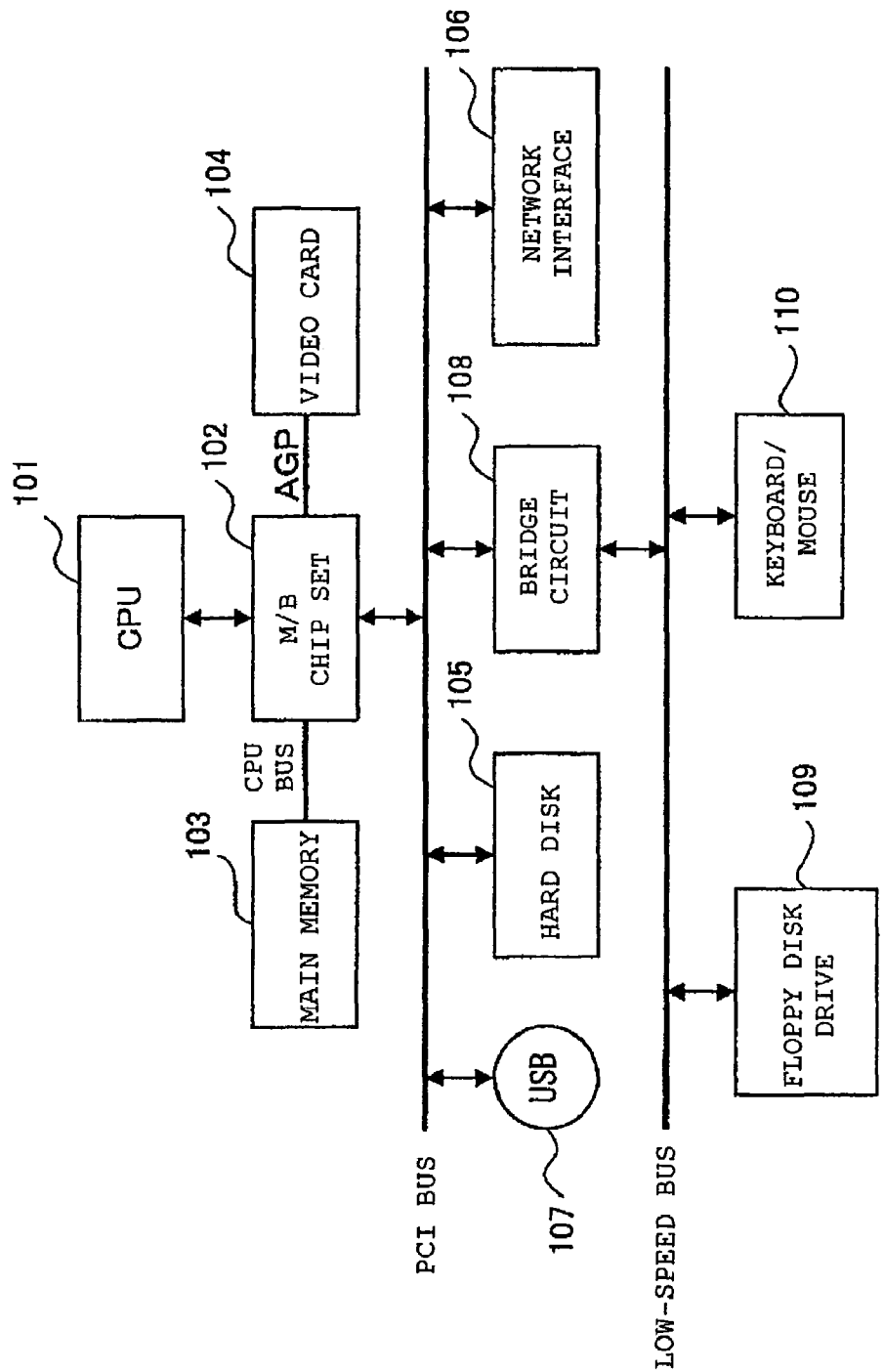
FIG. 1 is a view schematically showing an example of a hardware configuration of an information processing apparatus which is suitable for realizing Embodiment 1 of the present invention.

The present invention provides methods, systems and apparatus for evaluating the XPath while subjecting an XML document to streaming processing. In an example embodiment, this is realized as the following XPath evaluating method for evaluating the XPath relevant to an XML document by use of a computer. This XPath evaluating method comprises a first step of serially inputting XML event strings constituting an XML document to be processed, a second step of serially evaluating the XPath relevant to the respectively inputted XML events and retaining information concerning a result of partial evaluation of the XPath in given storing means when the XPath is partially established with respect to a given XML event, and a third step of repeating the partial evaluation of the XPath along with the input of the XML event strings while considering the result of the partial evaluation retained in the storing means and judging that the XPath is established with respect to the XML document to be processed when the last part of the XPath is established.

In this way, the evaluation of the XPath is carried out individually concerning inputted XML events, and judgment of establishment of the entire XPath is made while accumulating the result of partial evaluation. Accordingly, the evaluation of the XPath by use of streaming processing becomes possible.

As concrete modes for retaining the evaluation and the result of partial evaluation of the XPath performed in the second step, the present invention discloses a mode using an automaton, a mode using stacks, and a mode using a document tree which is serially constructed along with the input of the XML event strings.

In the mode using an automaton, an automaton for expressing the XPath to be evaluated is generated, and the XPath is evaluated by allowing transition of a state of this automaton based on the respective XML events. The result of this partial evaluation is retained as the state of the automaton.

In the mode using stacks, a first stack which expresses the XPath is generated to be evaluated with a string of stack elements. Meanwhile, a second stack for analyzing a nested structure of the XML document to be processed based on the respective XML events is generated. Then, the XPath is evaluated by comparing the first stack with the second stack. The result of this partial evaluation is retained as the stack elements of the second stack.

In the mode using the document tree serially constructed along with the input of the XML event strings, the document tree indicating a document structure of the XML document to be processed is serially constructed based on the input of the respective XML events. Along with construction of this document tree, the XPath is evaluated by use of the document tree with a part which has been constructed. In this case, since the document tree is constructed along with the input of the XML event strings, the XPath is evaluated every time when a new node is added to the document tree so as to check whether the XPath is established or not. However, there is also a case where a plurality of nodes satisfying establishment of the XPath exist. Accordingly, the information concerning the result of partial evaluation is retained so that the information can be used to evaluate a subsequent XML event.

The present invention also provides methods, systems and apparatus to realize an XPath evaluating apparatus having the following configuration. This XPath evaluating apparatus includes an evaluation executing unit for executing evaluation of the XPath by streaming processing, and an XML event transferring unit for inputting XML event strings which constitute an XML document to be processed and serially transferring the XML event strings to the evaluation executing unit. This evaluation executing unit serially evaluates the XPath with respect to each of the XML events transferred from the XML event transferring unit and retains information concerning a result of partial evaluation of this XPath with respect to a given XML event when this XPath is partially established. Moreover, the XPath evaluating apparatus judges that the XPath is established in this XML document when the last step of this XPath is established.

In order to realize a mode using an automaton as a concrete mode for retaining the evaluation and the result of the partial evaluation of the XPath described above, this XPath evaluating apparatus may further include an automaton generating unit for generating an automaton which expresses the XPath. Similarly, in order to realize a mode using stacks, the XPath evaluating apparatus may be configured to further include a stack generating unit for generating a first stack which expresses the XPath with a string of stack elements.

Another XPath evaluating apparatus according to the present invention includes a document tree constructing unit for inputting XML event strings which constitute an XML document and serially constructing a document tree indicating a document structure of the XML document based on inputted XML events along with the input of the respective XML events, an XML event transferring unit for inputting the XML event strings which constitute the XML document to be processed and serially transferring the XML event strings to the document tree constructing unit, and an evaluation executing unit for evaluating the XPath along with construction of the document tree by this document tree constructing unit while using the document tree with a part which has been constructed.

Furthermore, the present invention is also realized as an information processing apparatus including an XML parser, an XPath evaluating unit having a function of the above-described XPath evaluating apparatus, and an application executing unit for inputting an XML event generated by the XML parser and executing processing of an XML document configured by the inputted XML events in response to an evaluation result of the XPath by the XPath evaluating unit.

Moreover, the present invention is also realized as a program for controlling a computer to execute processing corresponding to the respective steps of the above-described XPath evaluating method, or as a program for causing a computer to function as the XPath evaluating apparatus or the information processing apparatus described above. This program can be provided by storing and distributing the program in a magnetic disk, an optical disk, a semiconductor memory, and other recording media, or by means of distributing the program through a network.

Now, the present invention will be described in detail based on example embodiments shown in the accompanying drawings. The present invention performs the evaluation of an XPath with respect to an XML document to be processed which is inputted in accordance with a streaming format, serially in response to the input of the XML document. As embodiments for realizing the XPath evaluation by this streaming processing, description will be made below regarding an embodiment using an automaton (Embodiment 1), an embodiment using stacks (Embodiment 2), and an embodiment using a tree (Embodiment 3). Note that these embodiments are generally realized by use of a personal computer, a workstation, and other computer apparatuses, or by use of various information processing apparatus including a personal digital assistant (PDA) or a cellular telephone.

Embodiment 1

In Embodiment 1, streaming processing of an XPath evaluation is realized by use of an automaton. FIG. 1 is a view schematically showing an example of a hardware configuration of an information processing apparatus which is suitable for realizing this embodiment. An information apparatus shown in FIG. 1 includes: a central processing unit (CPU) 101 which is operating means; a main memory 103 connected to the CPU 101 through a motherboard (M/B) chip set 102 and a CPU bus; a video card 104 similarly connected to the CPU 101 through the M/B chip set 102 and an accelerated graphics port (AGP); a hard disk 105, a network interface 106, and a USB port 107 which are connected to the M/B chip set 102 through a peripheral component interconnect (PCI) bus; and a floppy disk drive 109 and a keyboard/mouse 110 which are connected to the M/B chip set 102 via this PCI bus through a bridge circuit 108 and a low-speed bus such as an industry standard architecture (ISA) bus.

It is to be noted, however, that FIG. 1 is just one example of the hardware configuration of a computer for realizing this embodiment. Accordingly, various other configurations can be adopted as long as this embodiment is applicable. For example, the computer may adopt a configuration in which only a video memory is loaded instead of providing the video card 104 while image data are processed by the CPU 101. Alternatively, it is possible to provide a drive for a compact disc read-only memory (CD-ROM) or a digital versatile disc read-only memory (DVD-ROM) through an inter face such as an AT attachment (ATA).

Figure 2:
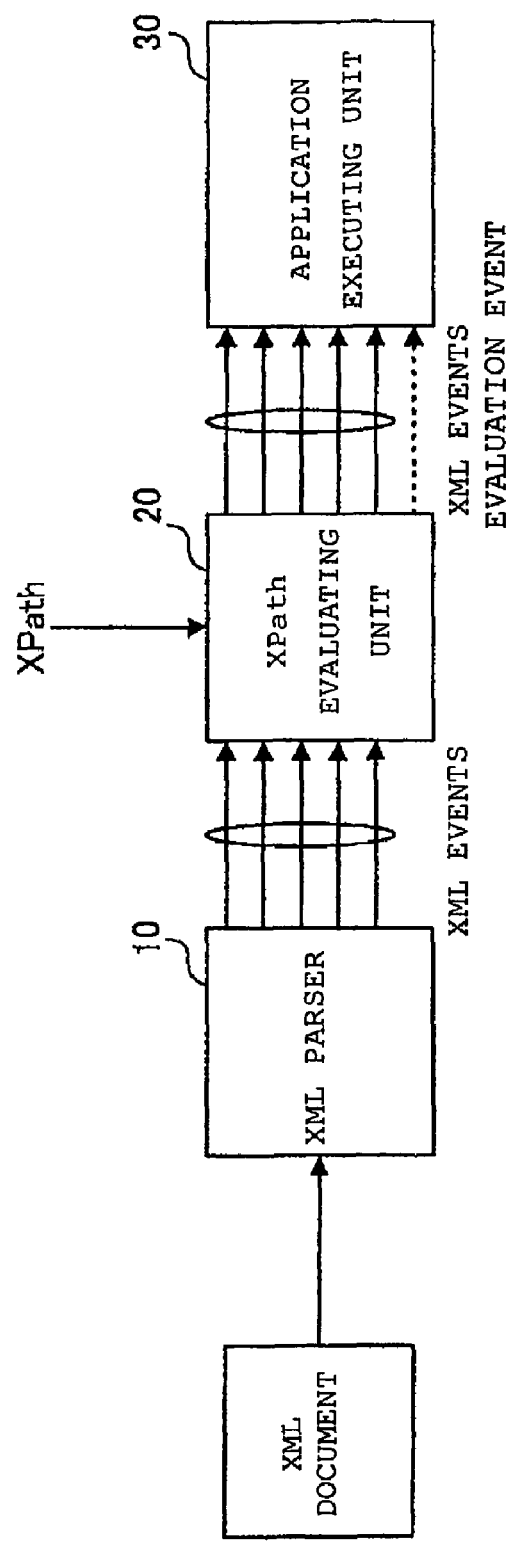
FIG. 2 shows an example of loading XPath evaluating means (an analyzing system) in Embodiment 1.

FIG. 2 is a view showing an example of loading XPath evaluating means (an analyzing system) in this embodiment. As shown in FIG. 2, an information processing apparatus according to this embodiment includes an XML parser 10 for parsing an XML document to be processed, an XPath evaluating unit 20 for evaluating the XPath with respect to the parsed XML document, and an application executing unit 30 for executing given information processing by use of the XML document after evaluation of the XPath.

The XML parser 10, the XPath evaluating unit 20, and the application executing unit 30 shown in FIG. 2 are virtual software blocks which are realized by controlling the CPU 101 with a program developed in the main memory 103 shown in FIG. 1, for example.

In FIG. 2, the XML parser 10 inputs and parses the XML document to be processed, and outputs and transmits an XML event for notifying a result of analysis to the XPath evaluating unit 20. The XML events are transmitted serially to the XPath evaluating unit 20 depending on every node in a tree structure (a document tree) of the XML document to be analyzed. A publicly known XML parser, which has been conventionally used in an information processing apparatus dealing with XML documents, can be used as the XML parser 10. In this embodiment, the XML document to be inputted is assumed to be a well-formed document.

The XPath evaluating unit 20 receives the XML events from the XML parser 10 and evaluates the XPath which is provided in advance.

Figure 3:
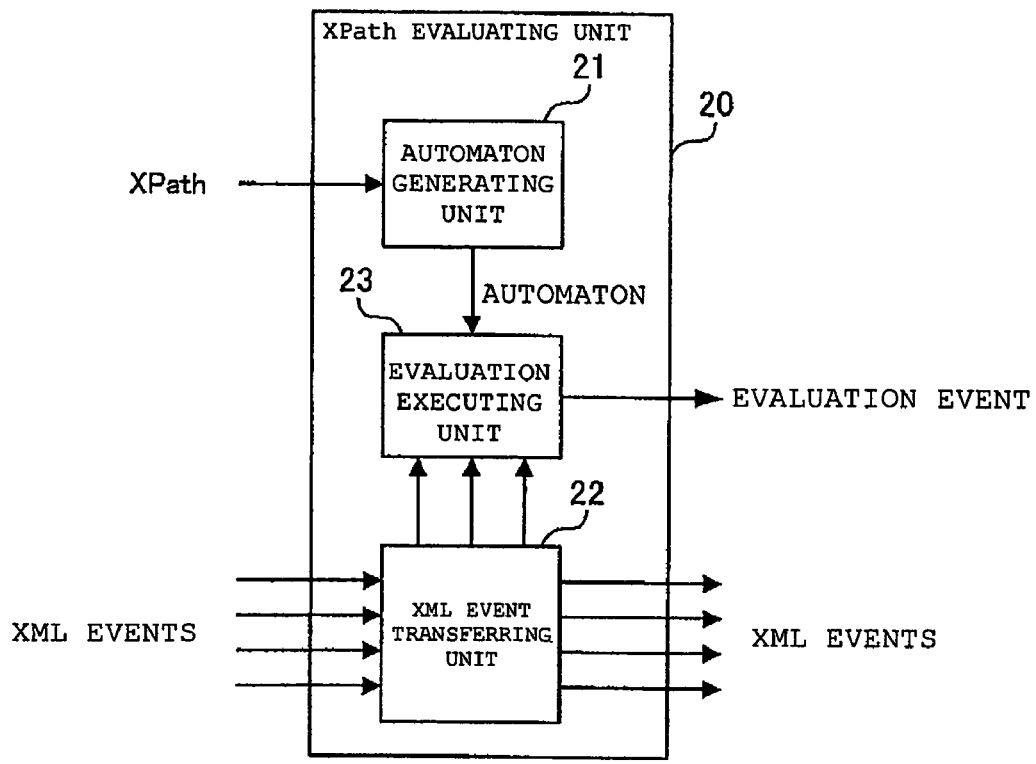
FIG. 3 is a view describing a functional configuration of an XPath evaluating unit in Embodiment 1.

FIG. 3 is a view showing a functional configuration of the XPath evaluating unit 20.

As shown in FIG. 3, the XPath evaluating unit 20 of this embodiment includes an automaton generating unit 21, an XML event transferring unit 22, and an evaluation executing unit 23.

The automaton generating unit 21 generates an automaton (a state transition machine) from the XPath which is provided in advance. In this embodiment, the XPath is evaluated with respect to an application using the API which is executed in a streaming format such as the SAX or the XNI. Therefore, due to the restriction by the streaming processing, functions of the XPath to be evaluated are partially limited. For example, an axis or a predicate which requires reference to a previously notified XML event is not realized upon the evaluation. However, such limitation does not cause a problem in the course of actual processing in many applications.

Now, limitation in the XPath will be concretely described herein.

1. The XPath will be defined as a location path. However, the use of an absolute path is permitted only when the XPath is evaluated from a root node of a tree structure of a subject XML document.
2. The axis should only be a forward axis. That is, the axis will be any of the following:
   self
   child
   descendant
   descendant-or-self
   following
   following-sibling
   attribute
   namespace Nevertheless, it is also possible to use a reverse axis under a certain condition and on special loading. Details will be described later.

3. The predicate will be treated as described below.
   1) An operator will be any of the following:
      or
      and
      =
      !=
   2) A primitive will be any of the following:
      * a location path, provided that an axis thereof will be any of the following:
         attribute
         namespace
         self
         parent
         ancestor
         ancestor-or-self;
      * a literal;
      * a number; and
      * a function call, except any of the following:
         last ( )
         id (object)
         string (object?), which is set to a root node or an element node.

Incidentally, in the XPath, a location path which does not use an abbreviated notation is expressed by a row of an axis, a node test, and a predicate, with junctions (which are referred to as steps) sectioned by a symbol "/". The automaton generating unit 21 expresses a state of evaluation of each step with the automaton. This automaton performs the following state transition.

Figure 4:
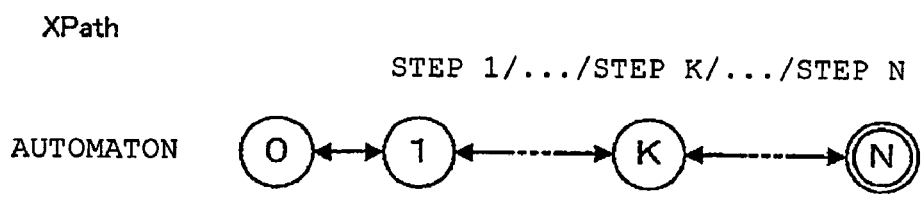
FIG. 4 is a view schematically showing an automaton generated by an automaton generating unit in Embodiment 1.

FIG. 4 is a view schematically showing an automaton generated by the automaton generating unit 21. First, the respective steps (the total quantity thereof is denoted by N) are numbered starting from the left side (the head). A situation where a step K is established at a time point when a given token is read in will be defined as a state K. Here, the situation where the step K is established refers to a situation where a start tag token of a node satisfying the step K has been read in but an end tag thereof has not been read in yet. Meanwhile, an initial situation will be defined as a state 0.

Here, an assumption is made herein that the start tag token of the node satisfying the step K has been read in at this moment so that a current situation moves to the state K. When a node satisfying a state K+1 is read in this state K, the situation moves to a state K+1. On the other hand, when the end tag of the step K is read in the state K, the situation moves to a state K−1. While such state transition is repeated, judgment is made that the location path is satisfied when the situation reaches a state N.

The above-described automaton generated by the automaton generating unit 21 is retained in a work area of the main memory 103 of FIG. 1, for example. The automaton will be used in processing by the evaluation executing unit 23 to be described later.

The XML event transferring unit 22 inputs the XML events outputted from the XML parser 10, and then serially transfers the XML events to the evaluation executing unit 23 depending on the nodes in the tree structure of the XML document. Moreover, the XML event transferring unit 22 serially transfers the XML events to the application executing unit 30 as well.

The evaluation executing unit 23 obtains the automaton generated by the automaton generating unit 21 and receives the XML events transferred from the XML event transferring unit 22. Accordingly, the evaluation executing unit 23 performs transition between the states in the automaton while serially reading token strings of the XML document. Thereafter, the evaluation executing unit 23 judges that the location path is satisfied at a time point when a token corresponding to the node satisfying the location path is read in. Such an evaluation result is transmitted to the application executing unit 30 as an evaluation event. Concrete procedures of the evaluation processing by the evaluation executing unit 23 will be described later.

The application executing unit 30 shown in FIG. 2 inputs the XML events transferred from the XML event transferring unit 22 of the XPath evaluating unit 20 and the evaluation event outputted from the evaluation executing unit 23, and executes processing of the XML document by streaming processing.

Next, processing by the XPath evaluating unit 20 of this embodiment will be described in more detail. As described above, in this embodiment, the automaton expressing the XPath to be evaluated is firstly generated and retained. Then, the XML event strings constituting the XML document to be processed are serially inputted, and the partial evaluation of the XPath is performed by causing the states of the automaton to perform transition based on these XML events. The result of the partial evaluation of the XPath is retained as the state of the automaton.

For the purpose of facilitation, the location path is herein assumed not to be inclusive of the predicate, and only "child" and "descendant" are considered as the axes. Treatment of a step including any of "following-sibling", "following", "self", "descendant-or-self", "attribute", and "namespace" as the axis, or treatment of a step including a predicate will be described later.

Figure 5:
FIGS. 5A to 5C are views showing examples of a location path, an automaton, and an XML document to be processed which are used in processing according to Embodiment 1.

FIGS. 5A to 5C are views showing examples of the location path, the automaton, and the XML document to be processed which are used in the processing according to this embodiment. Given the location path shown in FIG. 5A, respective steps starting from the left in this location path will be referred to as a step 1, a step 2, and a step 3, respectively. The state of the automaton generated from this location path by the automaton generating unit 21 will be as shown in FIG. 5B.

Here, an assumption will be made herein that the XML document shown in FIG. 5C is inputted. This XML document is parsed by the XML parser 10 and sent to the Xpath evaluating unit 20 as the XML events depending on the nodes. Then, the XML event transferring unit 22 transfers the XML events serially to the evaluation executing unit 23. Here, in FIG. 5C, an abbreviated notation <title/> is applied to a case where there is no element content such as <title> </title> (hereinafter similarly applicable to other XML documents).

The evaluation executing unit 23 uses the above-described automaton generated by the automaton generating unit 21 and performs state transition of the automaton based on the XML events transferred from the XML event transferring unit 22, and thus evaluates the location path corresponding to the automaton. Here, in the actual processing, the state transition and the evaluation of the automaton are performed by building a stack for analyzing a nested structure of the XML document (an XML event string stack) in a memory area of the main memory 103 of FIG. 1, for example. That is, the evaluation executing unit 23 retains the XML event strings transmitted from the XML parser 10 serially in this XML event string stack.

This XML event string stack pushes a node corresponding to a start tag on the condition that the start tag is read in, and pops the node on the condition that an end tag is read in. A bottom of the stack will represent a root node herein.

Accordingly, the evaluation executing unit 23 serially performs pushing and popping to the XML event string stack in accordance with the input of the XML event strings. Such operations are performed consistently from the start to the end of the XML document irrespective of whether the location path is relative or absolute. During the operations, every time when a given start tag is read in and a node corresponding to the tag is pushed to the XML event string stack, judgment is made as to whether or not the node (assuming the current state as the state K) satisfies a step corresponding to the state K+1 (i.e. the step K+1). If a result of this judgment is "yes", the current state moves to the state K+1. In this event, a link between a stack element and the state is established. In other words, mapping is configured between the pushed nodes and the states established by the nodes. Regarding the state 0, a stack element corresponding to a context node is linked when the location path is a relative path; meanwhile, the bottom of the stack (i.e. the root node) is linked when the location path is an absolute path. On the other hand, in case of popping from the XML event string stack, detection is made as to whether or not a popped element is linked to the state. When the element is linked to the state, the state is set back to the immediately preceding state.

Now, description will be made sequentially with reference to FIGS. 5A to 5C. First, at an initial state of the state 0, a token <document> is read in and a node "document" is pushed. In this event, the state of the XML event string stack is set as:

bottom|document

Since this node "document" satisfies the step 1, the state transition from the state 0 to the state 1 takes place.

Next, a token <title> is read in, and a node "title" is pushed. In this event, the state of the XML event string stack is set as:

bottom|document|title

This node "title" does not satisfy the condition "child::chapter" of the node "document" linked to the state 1. That is, the node "title" does not satisfy the step 2. Accordingly, no state transition takes place and reading a token is continued instead.

After a token </title> being the end tag of the node "title" is read in and the node "title" is popped, a token <chapter> is subsequently read in and a node "chapter" is pushed. Since this node satisfies the step 2, the state transition from the state 1 to the state 2 takes place. In this event, the state of the XML event string stack is set as:

bottom|document|chapter

Next, a token </chapter> is read in and the node "chapter" is thereby popped. In this event, the state 2 is linked to the stack element to be popped. Therefore, in this case, the state of the automaton is transferred from the state 2 back to the immediately preceding state 1 simultaneously with the popping.

Thereafter, the token <chapter> is read in again and the node "chapter" is pushed, whereby the state transition from the state 1 to the state 2 takes place. Moreover, a token <section> is read in and a node "section" is pushed. Since this node satisfies the step 3, the state transition from the state 2 to the state 3 takes place. At this time point, the evaluation executing unit 23 judges that the location path is established, and transmits the evaluation event indicating the evaluation result to the application executing unit 30.

In the foregoing description, the evaluation executing unit 23 is designed to output the evaluation event when the location path is established. However; it is also possible to design the evaluation executing unit 23 to output an evaluation event indicating establishment or non-establishment every time when each XML event is processed.

Next, a description will be made regarding treatment of other forward axes.

1. Treatment of "attribute" and "namespace"

To evaluate a location path including a step with an axis "attribute", a step corresponding to a state immediately subsequent to a state after transition is detected upon state transition. Then, if the step is "attribute", the step is evaluated by use of an attribute of the most recently inputted token. The state is moved to one notch forward when a node satisfies the step in this evaluation. On the contrary, if the node does not satisfy the step, the original state transition is canceled.

Regarding "namespace", the "namespace" in the current context is managed, and then the evaluation of the step is executed similarly to the case of "attribute".

Concerning "attribute" and "namespace", an operation of the XML event string stack does not take place in the process when any of these axes is established. Therefore, a node to be linked to any of those states is deemed as a NULL node, which represents that no node is applicable thereto.

2. Treatment of "self"

To evaluate a location path including a step with an axis "self", a step corresponding to a state immediately subsequent to a state after transition is detected upon state transition. Then, the step is evaluated if the step is "self". The state moves to one notch forward when a node satisfies the step in this evaluation. On the contrary, if the node does not satisfy the step, the original state transition is canceled. An operation of the XML event string stack does not take place in the process when the axis "self" is established. Therefore, a node to be linked to this state is deemed as a NULL node, which represents that no node is applicable thereto.

3. Treatment of "Descendant-or-Self"

To evaluate a location path including a step with an axis "descendant-or-self", the axis of the step is firstly regarded as "self", and the operation in the above-described section 2 is performed. When judgment is made in this operation that a node does not satisfy the step, the evaluation is continued while the axis is regarded as "descendant".

4. Treatment of "Following-Sibling"

The following operation is performed to evaluate a location path including a step with an axis "following-sibling".

To begin with, a step with an axis "following-sibling" is defined as a step K and a state corresponding thereto is defined as a state K. Basically, with respect to a stack top node at a time point when a node which was pushed upon establishment of a step K–1 is popped, a node which will be pushed subsequent to the node will be a node to be selected in the step K. However, attention is required herein. Specifically, the node which satisfied this step K is not only a candidate for the node to be selected in the step K but also a candidate to be selected in the step K–1 at the same time. For example, a location path is herein assumed to be described as follows:

/child::document/child::chapter/following-sibling::
    chapter

In this case, the second "chapter" in the following description can be selected both in the second step and in the third step:

```
<document>
    <chapter>--1
    </chapter>
    <chapter>--2
    </chapter>
    <chapter>--3
    </chapter>
</document>
```

Such ambiguity must be strictly interpreted in the event of performing node selection depending on "position". For example, the second chapter and the third chapter must be selected at the same time according to the location path described as follows:

/child::document/child::chapter/following-sibling::
    chapter[1]

Meanwhile, the third chapter must be selected according to the location path described as follows:

/child::document/child::chapter[2]/following-sibling::
    chapter

Accordingly, in this embodiment, the process is divided in two at a time point when the node is judged to satisfy the step K–1, and processing is performed such that the respective processes continue state transition corresponding to two ways of interpretation of the location path. In one of the processes, the state performs transition to the state which is immediately precedent to the state linked to the node at this point (which is normally a state K–2, or a state immediately precedent thereto when the state K–2 includes "self"), and the evaluation is continued thereafter.

The following operation takes place in the other process. Firstly, the state remains at the state K–1. In the state K–1, if any node is pushed while the stack top node at the time point when the node pushed as a result of a judgment to satisfy the step K–1 is popped remains as a stack top, then judgment is made whether or not the node satisfies the step K. When the node satisfies the step K, the state is transferred to the state K. Then, the pushed node is linked to the state K and the evaluation is continued thereafter. Meanwhile, when the node linked to the state K is popped, the state is set back to the state K–1. In the state K–1, when an end tag token for the node satisfying the step K–1 is inputted, that is, when the stack top node at the time point when the node pushed as a result of the judgment to satisfy the step K–1 is popped is popped, the operation is terminated because there is no more node to be selected in the step K in this process.

5. Treatment of "Following"

The following operation is performed to evaluate a location path including a step with an axis "following".

Since this case also bears a possibility to cause ambiguity of the location path, division of the process similar to the case of "following-sibling" is required. To begin with, a step with an axis "following" is defined as a step K and a state corresponding thereto is defined as a state K. Similar to the above-described section 4, the process is divided in two at a time point when the node is judged to satisfy the step K–1. In one of the processes, the state performs transition to the state which is immediately precedent to the state linked to the node at this point, and the evaluation is continued thereafter.

The following operation takes place in the other process. Firstly, the state remains at the state K–1. If any node is pushed in the state K–1, then a judgment is made whether or not the node satisfies the step K. When the node satisfies the step K, the state is transferred to the state K. Then, the pushed node is linked to the state K and the evaluation is continued thereafter. In the case of "following", the state remains as the state K even when an end tag token for the node satisfying the step K−1 is inputted in the state K−1.

Next, a description will be made regarding treatment of predicates.

Basically, a predicate can be treated when it is possible to compose the predicate by use of information accumulated in the stack at the moment of state transition. That is, when a start tag token satisfying the step K is read in, it is possible to describe information regarding the node which can be composed in that state or information regarding an "ancestor" of the node remaining in the stack as the predicate. Moreover, it is possible to treat a position function by providing counters to the respective states. In the state of establishment of the step as described above, one notch is added to the counter of the state corresponding to the step. The predicate including the position function is evaluated based on the value of this counter, and a judgment is made whether or not the node satisfies the step eventually.

Next, description will be made regarding treatment of reverse axes.

In this embodiment, it is possible to use a reverse axis such as "parent", "ancestor", or "ancestor-or-self" in very limited location paths. As described in the treatment of the predicates, the information on the ancestor of the current node is accumulated as the state of the automaton. Therefore, if all the steps on the right side from a certain point of a location path are any of "parent", "ancestor", "ancestor-or-self" and "self", then a stack operation may be stopped at that point and the steps may be evaluated while retracing those steps.

Figure 6:
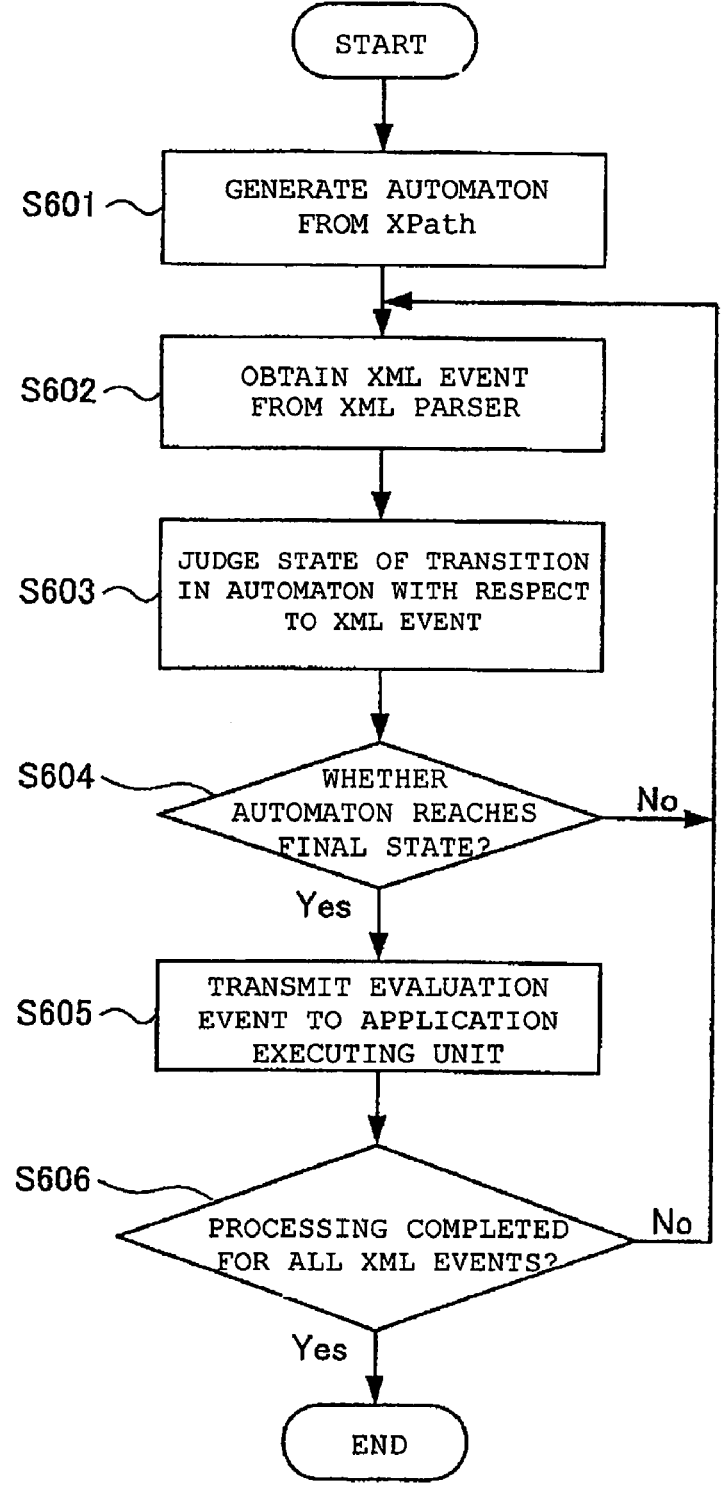
FIG. 6 is a flowchart describing streaming processing of the XML document according to Embodiment 1.

FIG. 6 is a flowchart which explains streaming processing of an XML document according to this embodiment. As shown in FIG. 6, the XPath evaluating unit 20 generates an automaton from the location path of the XPath provided in advance by the automaton generating unit 21 as an initial operation (Step 601). When an XML document to be processed is inputted and XML events are sent from the XML parser 10 (Step 602), the evaluation executing unit 23 of the XPath evaluating unit 20 serially judges the state transition in the automaton corresponding to the XML events (Step 603). This state transition represents the partial evaluation of the location path (the XPath) corresponding to the automaton. The result of this partial evaluation is retained as the current state of the automaton.

Thereafter, the input of the XML events and judgment of the state transition are repeated until the automaton reaches the final state. When the automaton reaches the final state, the location path corresponding to this XML document is evaluated as established, and the evaluation event is sent to the application executing unit 30 (Steps 604 and 605).

The application executing unit 30 obtains the XML events outputted from the XML parser 10 and the evaluation events outputted from the evaluation executing unit 23 of the XPath evaluating unit 20. The application executing unit 30 serially processes the XML events in accordance with the evaluation event.

When all the processing from Steps 602 to 605 is executed for all the XML events regarding the XML document to be processed which are sent from the XML parser 10, the streaming processing of the XML document according to this embodiment is completed (Step 606).

Embodiment 2

In Embodiment 2, the evaluation of the Xpath corresponding to the processing by use of the state transition of the automaton as described in Embodiment 1 is realized by use of stacks for analyzing a nested structure of an XML document. That is, this embodiment is implemented by a method of expressing both of the XPath and XML event strings with stacks and comparing the XPath and the XML events every time the XML event is notified. Similar to Embodiment 1, this embodiment is realized by, for example, the information processing apparatus shown in FIG. 1.

Figure 7:
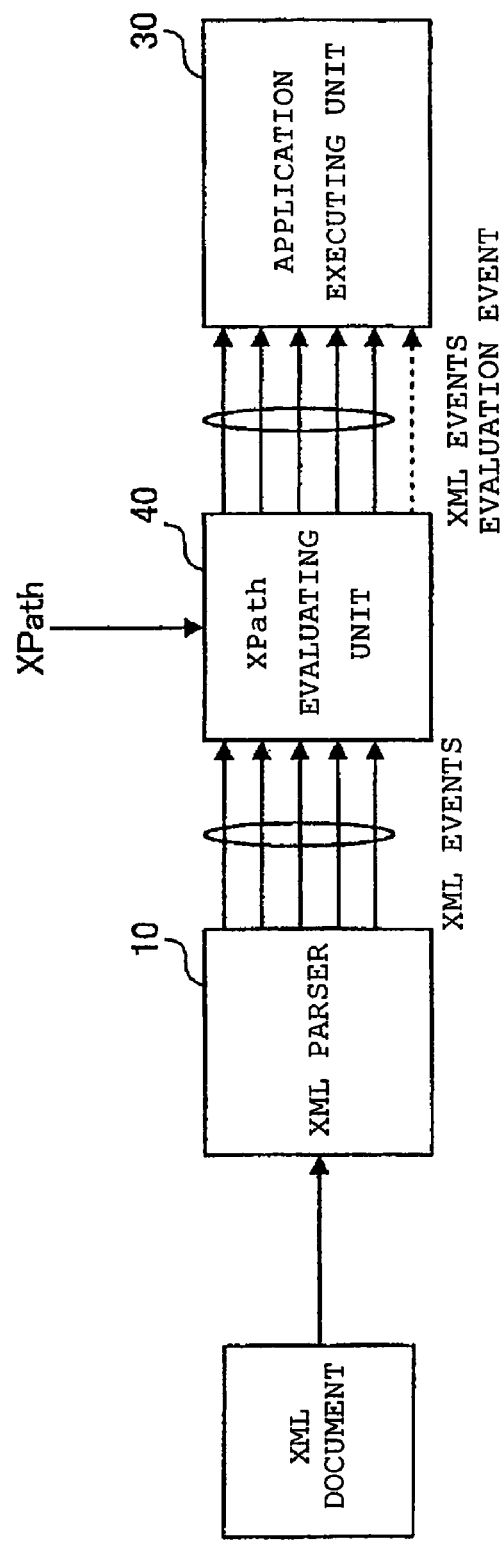
FIG. 7 shows an example of loading XPath evaluating means (an analyzing system) in Embodiment 2.

FIG. 7 is a view showing an example of implementing XPath evaluating means (an analyzing system) in this embodiment. As shown in FIG. 7, the information processing apparatus according to this embodiment includes an XML parser 10 for parsing an XML document to be processed, an XPath evaluating unit 40 for evaluating the XPath with respect to the parsed XML document, and an application executing unit 30 for executing given information processing by use of the XML document after the evaluation of the XPath.

The XML parser 10, the XPath evaluating unit 40, and the application executing unit 30 shown in FIG. 7 are virtual software blocks which are realized by controlling the CPU 101 with a program developed in the main memory 103 shown in FIG. 1, for example. Since the XML parser 10 and the application executing unit 30 are similar to the corresponding constituents in Embodiment 1, same reference numerals are designated and explanation thereof is omitted.

The XPath evaluating unit 40 receives the XML events from the XML parser 10 and evaluates the XPath which has been provided in advance.

Figure 8:
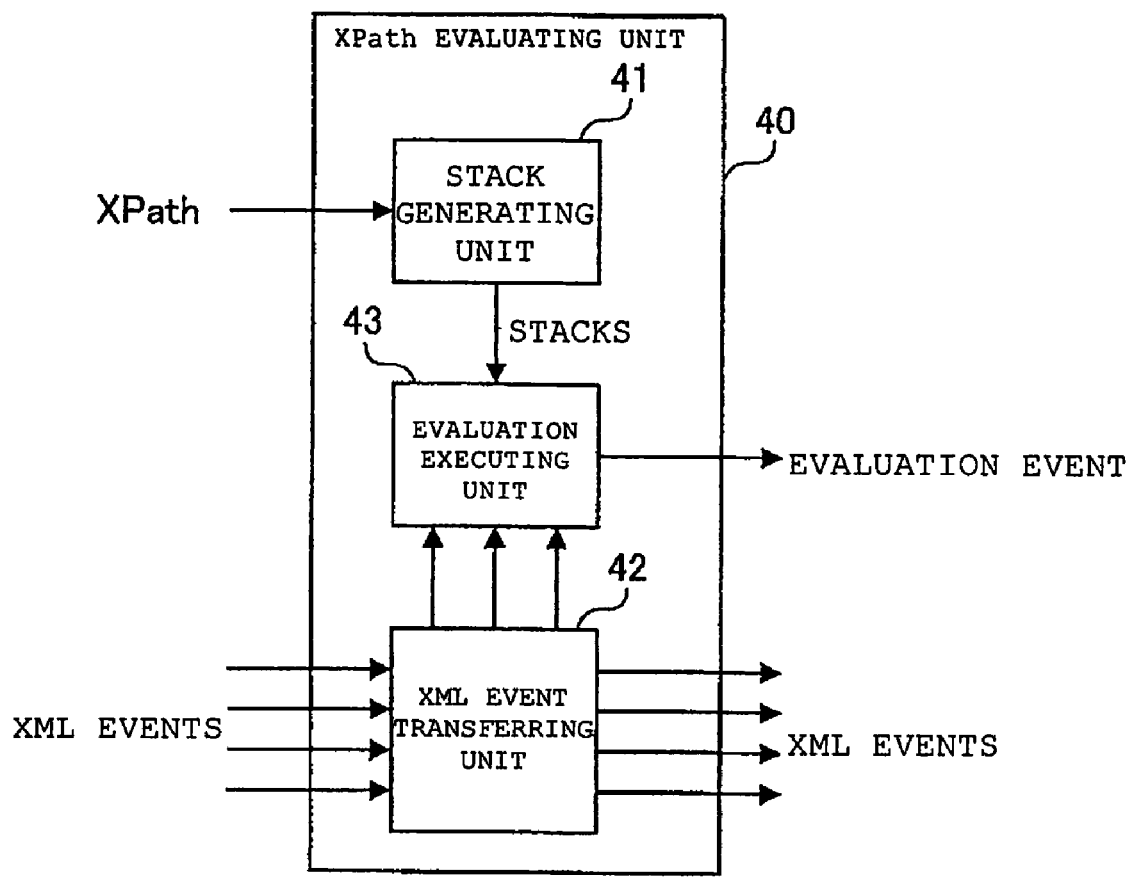
FIG. 8 is a view describing a functional configuration of an XPath evaluating unit in Embodiment 2.

FIG. 8 is a view showing a functional configuration of the XPath evaluating unit 40. As shown in FIG. 8, the XPath evaluating unit 40 of this embodiment includes a stack generating unit 41, an XML event transferring unit 42, and an evaluation executing unit 43.

The stack generating unit 41 generates a stack from the XPath which has been provided in advance. Here, the stack is a data structure for expressing a step of the XPath. Generation of the stack from the XPath is performed as follows.

Specifically, regarding the respective steps of the XPath, the stack generating unit 41 expresses a node test and a predicate by stack elements and pushes the stack elements to the stack in accordance with an axis. For example, regarding "child::para", "para" is expressed by a stack element and is pushed to an existing stack. Here, the node test and the predicate may be expressed by any kinds of stack elements as long as the node test and the predicate can be evaluated appropriately with respect to the XML event strings. However, when a predicate "position ( )" is included therein, a counter is prepared for retaining a frequency of coincidence of the stack.

FIG. 9 is a view exemplifying relations between the types of axes and the stacks to be generated. Moreover, in FIG. 9, respective arrows (straight arrows and waved arrows) represent comparison of an original stack and comparison of a subsequent stack in case of coincidence. To be more precise, a straight arrow represents comparison of an original stack and comparison of a subsequent stack in case of coincidence. On the contrary, a waved arrow represents comparison of an original stack and comparison of a subsequent stack in case of coincidence and only when a specific XML event is notified. The specific XML event in this case varies depending on the type of the axis (a difference between "following-sibling" and "following").

*In Case of "Following-Sibling"

XML events corresponding to sibling nodes and descendant nodes thereof after a node coincident with the stack element at the head of the original stack. A subsequent stack is compared based on a stack element corresponding to the XML event relevant to the sibling node.

*In Case of "Following"

XML events corresponding to nodes after a node coincident with the stack element at the head of the original stack. However, XML events corresponding to descendant nodes thereof are excluded. A subsequent stack is compared based on stack elements corresponding to the XML events respectively relevant to the nodes described above.

FIG. 10 is a view showing a variety of stacks to be generated by the XPath based on the relations shown in FIG. 9. The stacks shown in FIG. 10 are respectively generated from each of the XPath of:

1) chapter/para;
2) chapter/para[@type="warning"];
3) chapter/para[2]; and
4) .//para Here, in the description above and in FIG. 10, description of a "child" axis is omitted based on the rules of notation in the XPath.

The stack generated by the stack generating unit 41 as described above is retained in the work area of the main memory 103 of FIG. 1, for example, and are used in the processing by the evaluation executing unit 43 to be described later.

Note that the limitation in the functions of the XPath is applicable in this embodiment similar to Embodiment 1.

The XML event transferring unit 42 inputs the XML events outputted from the XML parser 10, and then serially transfers the XML events to the evaluation executing unit 43 depending on the nodes in the tree structure of the XML document. Moreover, the XML event transferring unit 42 serially transfers the XML events to the application executing unit 30 as well.

The evaluation executing unit 43 obtains the stack generated by the stack generating unit 41 and receives the XML events transferred from the XML event transferring unit 42. Accordingly, the evaluation executing unit 43 operates the stack while serially reading token strings of the XML document. Thereafter, the evaluation executing unit 43 judges that the XPath is satisfied at a time point when a token corresponding to the node satisfying the XPath is read in. Such an evaluation result is transmitted to the application executing unit 30 as an evaluation event.

In this embodiment, similar to Embodiment 1, a stack for analyzing a nested structure of an XML document (an XML event string stack) is introduced as a data structure for realizing evaluation of the XPath by use of the above-described stack. That is, the evaluation executing unit 43 prepares the XML event string stack in addition to the above-described stack for the XPath generated by the stack generating unit 41, and retains the XML event strings transmitted from the XML parser 10 in this XML event string stack. Regarding this XML event string stack, when an XML event corresponding to a start tag is inputted, the XML event is expressed by a stack element and is pushed to the stack in principle. Moreover, the stack is popped when an XML event corresponding to an end tag is inputted. Meanwhile, when an XML event corresponding to a text or the like is inputted, this XML event is also expressed by a stack element and is pushed to the stack. However, this stack is popped immediately after comparison of the stack is completed. Here, the XML event may be expressed by any stack element as long as the information retained by the event continues to be retained.

Moreover, the evaluation executing unit 43 evaluates the XPath every time when the XML event is transferred from the XML event transferring unit 42 by comparing the XML event string stack and the stack for the XPath based on a stack element corresponding to an XML event of a noted node in the XML document. Here, comparison of stacks refers to comparison of corresponding stack elements. Meanwhile, comparison of the stack elements refers to evaluating a node test and predicate which correspond to the relevant XML event (a previously notified XML event).

Comparison of the stacks is started from the final stack element in principle. When a mismatched stack element is detected, the comparison processing is terminated immediately. Moreover, it is possible to compare all the stack elements every time, or alternatively, it is possible to retain the position of the stack element which was mismatched upon comparison and to resume comparison from the mismatched stack element in the next comparison processing.

Coincidence of the stack means matching of the XPath with the node corresponding to the event which is notified most recently. However, when the counter is provided to the stack for the XPath, a count value of the corresponding stack element in the XML event string stack is incremented every time of coincidence of the stack. Then, a judgment is made that the XPath is matched only when the count value of the stack element coincides with a count value of the stack for the XPath.

As described above, in this embodiment, the stack for the XPath (a first stack) is generated in which the XPath to be evaluated is expressed by a string of stack elements, and the XML event string stack (a second stack) is generated for analyzing the nested structure of the XML document to be processed based on each of the XML events inputted by inputting the XML event string which constitutes the XML document to be processed. Thereafter, partial evaluation of the XPath is performed by comparing the first stack with the second stack. A result of the partial evaluation of the XPath is retained as a stack element of the XML event string stack.

Moreover, as described above, operation of the XML event string stack is similar to the operation of the XML event string stack described in Embodiment 1. Therefore, the operation and the comparison of the XML event string stack correspond to the state transition of the automaton described in Embodiment 1. However, implementation is easy in Embodiment 2 because the evaluation of the XPath is executed only by matching the data accumulated in the stack.

Next, a description will be made in more detail regarding the processing by the XPath evaluating unit 40 of this embodiment.

FIG. 11 is a view showing an example of the XML document to be processed, and FIG. 12A to FIG. 14B are views showing aspects of the evaluation processing using the stack with respect to the XML document of FIG. 11. Here, in FIG. 11, abbreviated notations such as abbreviating "document" to "doc" are applied to respective tags as appropriate (hereinafter similarly applicable to other XML documents).

An assumption is made herein that "chapter/para[2]" shown in (3) of FIG. 10 is given as the XPath. That is, establishment of this XPath is judged when a node "para" is detected two notches behind a node "chapter" in a given event string of the XML document. The stack to be generated by the stack generating unit 41 with respect to the XPath is as shown in FIG. 10.

FIG. 12A to FIG. 14B shows SAX event strings (the XML event strings) with respect to the XML document of FIG. 11 and aspects of comparison by the evaluation executing unit 43 when the respective SAX event strings are inputted in a sequential order.

To begin with, a SAX event "startDocument" indicating a start of a document is inputted, and comparison of the stacks is initiated (FIG. 12A). At this point, the stack element of the XML event string stack is empty (NULL). Next, a SAX event "startElement: doc" indicating a start of an element (a node) is inputted (FIG. 12B), and reading of a token (a SAX event) is continued further.

Next, a SAX event "startElement: chapter" indicating a start of the element is inputted, and the XML event string stack is pushed and compared with the stack for the XPath (FIG. 12C). Although this stack element is matched, the stack element "para" is not matched at this point of time. Accordingly, reading of a token (a SAX event) is continued further. Subsequently, a SAX event "startElement: para" is inputted, and the XML event string stack element is pushed and compared with the stack for the XPath (FIG. 13A). Although this stack is matched, since this is the first node "para" appearing in the XML document shown in FIG. 11, a counter value (current_pos) for dealing with a position function (pos=2) is incremented by one notch, and then reading of a token (a SAX event) is continued further.

Thereafter, SAX events "endElement: para" and "endElement: chapter" indicating ends of the elements are inputted and the corresponding stack elements in the XML event string stack are respectively popped (FIGS. 13B and 13C). Then, the SAX event "startElement: chapter" is inputted again, and the XML event string stack is pushed and compared with the stack for the XPath (FIG. 14A). This stack element is matched. Subsequently, the SAX event "startElement: para" is inputted, and the XML event string stack is pushed and compared with the stack for the XPath (FIG. 14B). This stack element is matched and the counter value is incremented by one notch. Accordingly, the counter value becomes "current_pos=2" and thereby satisfies a demand of the position function. Therefore, a judgment is made that the XPath "chapter/para[2]" is established in the XML document of FIG. 11.

Incidentally, in the foregoing description, the node is a candidate for the node to be selected in the step K and also a candidate for the node to be selected in the step K-1 at the same time, concerning "following-sibling" and "following". Accordingly, in this embodiment, the process is divided in two at the time point when the node pushed upon establishment of the step K-1 is popped, and the respective processes continue stack operations corresponding to two ways of interpretation of the location path. Such operations will be described in detail with concrete examples.

FIG. 15 is a view showing an example of the XML document to be processed, FIG. 16 is a view showing the XPath to be evaluated and the stack to be generated from this XPath. FIG. 17A to FIG. 19B are views showing aspects of the evaluation processing using the stack with respect to the XML document of FIG. 15.

As shown in FIG. 16, an assumption is made herein that "chap/para[@num="2"]/following-sibling::para" is given as the XPath. That is, establishment of this XPath is evaluated when a sibling node "para" is detected subsequent to a node "para num="2"" behind a node "chapter" in a given event string of the XML document.

FIG. 17A to FIG. 19B, in a sequential order, shows SAX event strings (the XML event strings) with respect to the XML document of FIG. 15 and aspects of comparison by the evaluation executing unit 43 when the respective SAX event strings are inputted.

To begin with, a SAX event "startDocument" indicating a start of a document, and subsequently a SAX event "startElement: doc" indicating a start of an element are inputted (FIGS. 17A and 17B), and reading of a token (a SAX event) is continued further. Next, a SAX event "startElement: chapter" indicating a start of the element is inputted, and the XML event string stack is pushed and compared with the stack for the XPath (FIG. 17C). Since the stack element "para" is not matched at this time point, reading of a token (a SAX event) is continued further.

Next, a SAX event "startElement: para, @num=1" is inputted, and the XML event string stack is pushed and compared with the stack for the XPath (FIG. 18A). This stack is not matched with the corresponding stack element (para@num=2) of the stack for the XPath. Accordingly, reading of a token (a SAX event) is continued further. Subsequently, a SAX event "endElement: para" indicating an end of the element is inputted and the corresponding stack elements in the XML event string stack are popped respectively (FIG. 18B). Thereafter, a SAX event "startElement: para, @num=2", is inputted, and the XML event string stack is pushed and compared with the stack for the XPath (FIG. 18C). This stack element is matched with the corresponding stack element of the stack for the XPath. Therefore, the comparison with the last half of the stack for the XPath (the stack element "para") shown in FIG. 16 is performed from that point on.

Next, the SAX event "endElement: para" is inputted, and the corresponding stack elements in the XML event string stack are popped respectively (FIG. 19A). Thereafter, a SAX event "startElement: para, @num=3" is inputted, and the XML event string stack is pushed and compared with the stack for the XPath (FIG. 19B). This stack element is matched with the last half of the stack for the XPath (the stack element "para"). Therefore, a judgment is made that the XPath "chap/para[@num="2"]/following-sibling::para" is established in the XML document of FIG. 15.

Figure 20:
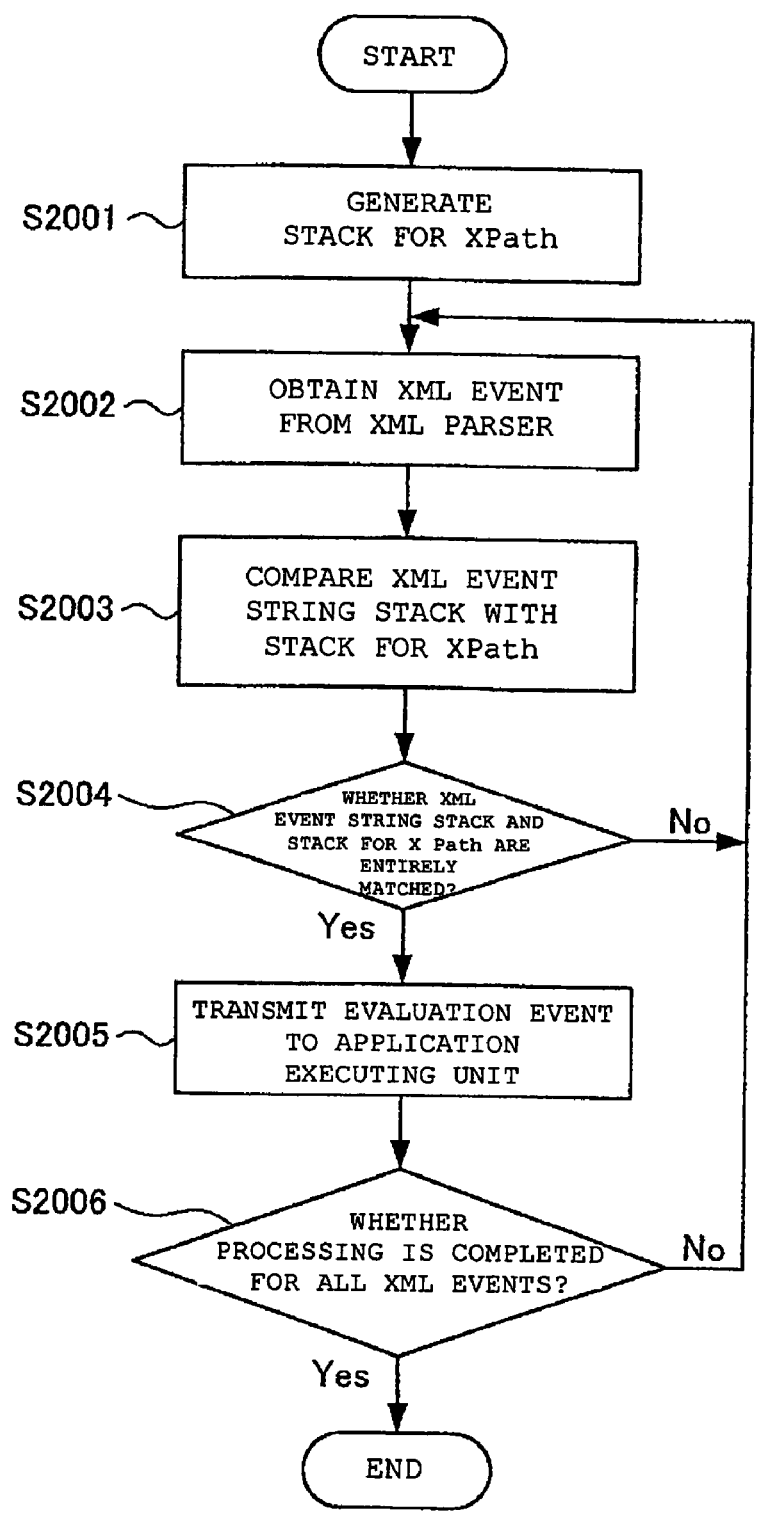
FIG. 20 is a flowchart describing streaming processing of the XML document according to Embodiment 2.

FIG. 20 is a flowchart which explains streaming processing of an XML document according to this embodiment.

As shown in FIG. 20, the XPath evaluating unit 40 generates the stack for the XPath from the location path of the XPath provided in advance by use of the stack generating unit 41 as an initial operation (Step 2001). When the XML document to be processed is inputted and the XML events are sent from the XML parser 10 (Step 2002), the evaluation executing unit 43 of the XPath evaluating unit 40 generates the XML event string stack as described above, and the comparison with the stack for the XPath is serially judged (Step 2003). The result of this comparison represents the partial evaluation of the XPath expressed by the stack for the XPath.

Thereafter, the input of the XML events and comparison of the stacks are repeated until this XML event string stack and the stack for the XPath are entirely matched. When both of the stacks are entirely matched, the location path corresponding to this XML document is judged as established, and the evaluation event is sent to the application executing unit 30 (Steps 2004 and 2005).

The application executing unit 30 obtains the XML events outputted from the XML parser 10 and the evaluation event outputted from the evaluation executing unit 43 of the XPath evaluating unit 40. The application executing unit 30 serially processes the XML events in accordance with the evaluation event.

When all the processing from Steps 2002 to 2005 is executed for all the XML events regarding the XML document to be processed which are sent from the XML parser 10, the streaming processing of the XML document according to this embodiment is completed (Step 2006).

Embodiment 3

In Embodiment 3, a tree with respect to an XML document (a document tree) is serially constructed while inputting XML event strings in a streaming format, and evaluation of the XPath is sequentially performed along with construction of this document tree.

As described above, in Embodiment 1, the automaton is generated from the XPath to be evaluated and the XPath is evaluated by serially performing the state transition of the automaton in accordance with the XML event strings which are inputted in the streaming format. Meanwhile, in Embodiment 2, the steps of the XPath are expressed by the first stack and the nested structure of the XML document inputted in the streaming format is expressed by the second stack, and the XPath is evaluated by comparing the contents of these stacks. Each of these methods loses the information regarding the evaluated portion of the XML event strings. Accordingly, it is possible to perform evaluation concerning a reverse axis under a very limited condition.

On the contrary, in this embodiment, the document tree is constructed along with the input of the XML event strings. Accordingly, all the information before inputting a given XML event is retained as the tree structure. Therefore, it becomes possible to evaluate the XPath including a step based on a reverse axis without any problem. Similar to Embodiment 1, this embodiment is realized by the information processing apparatus shown in FIG. 1, for example.

Figure 21:
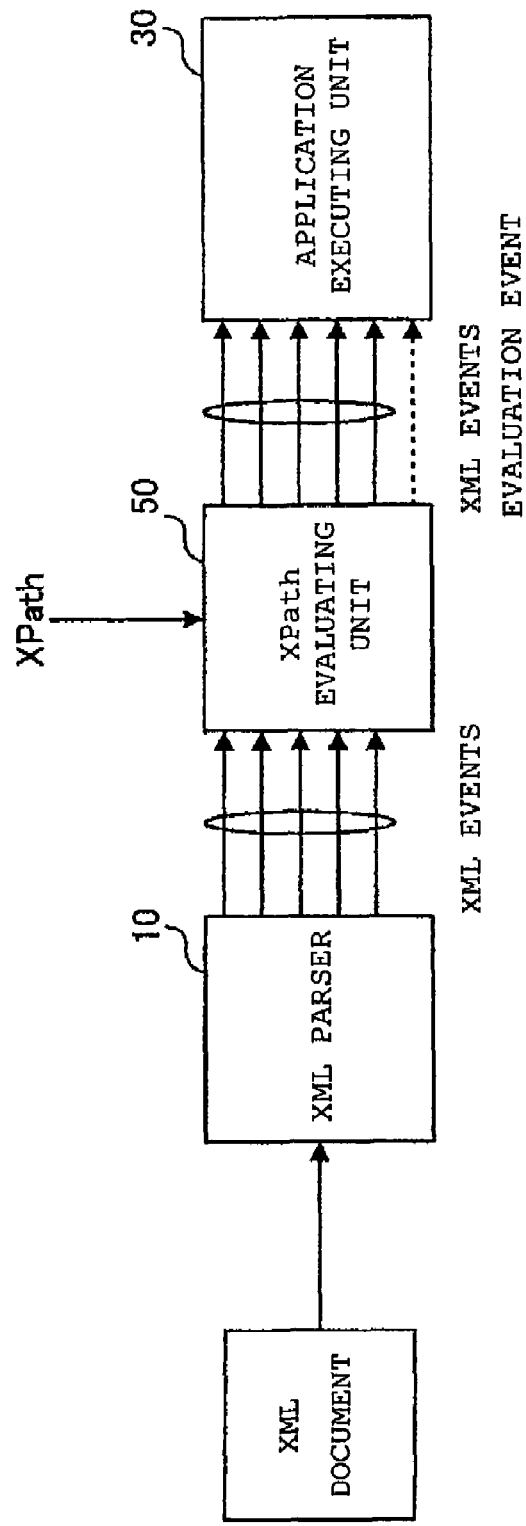
FIG. 21 shows an example of loading XPath evaluating means (an analyzing system) in Embodiment 3.

FIG. 21 is a view showing an example of loading XPath evaluating means (an analyzing system) in this embodiment. As shown in FIG. 21, the information processing apparatus according to this embodiment includes an XML parser 10 for parsing an XML document to be processed, an XPath evaluating unit 50 for evaluating the XPath with respect to the parsed XML document, and an application executing unit 30 for executing given information processing by use of the XML document after the evaluation of the XPath.

The XML parser 10, the XPath evaluating unit 50, and the application executing unit 30 shown in FIG. 21 are virtual software blocks which are realized by controlling the CPU 101 with a program developed in the main memory 103 shown in FIG. 1, for example. Since the XML parser 10 and the application executing unit 30 are similar to the corresponding constituents in Embodiment 1, same reference numerals are designated and explanation thereof is omitted.

The XPath evaluating unit 50 receives the XML events from the XML parser 10 and evaluates the XPath which has been provided in advance.

Figure 22:
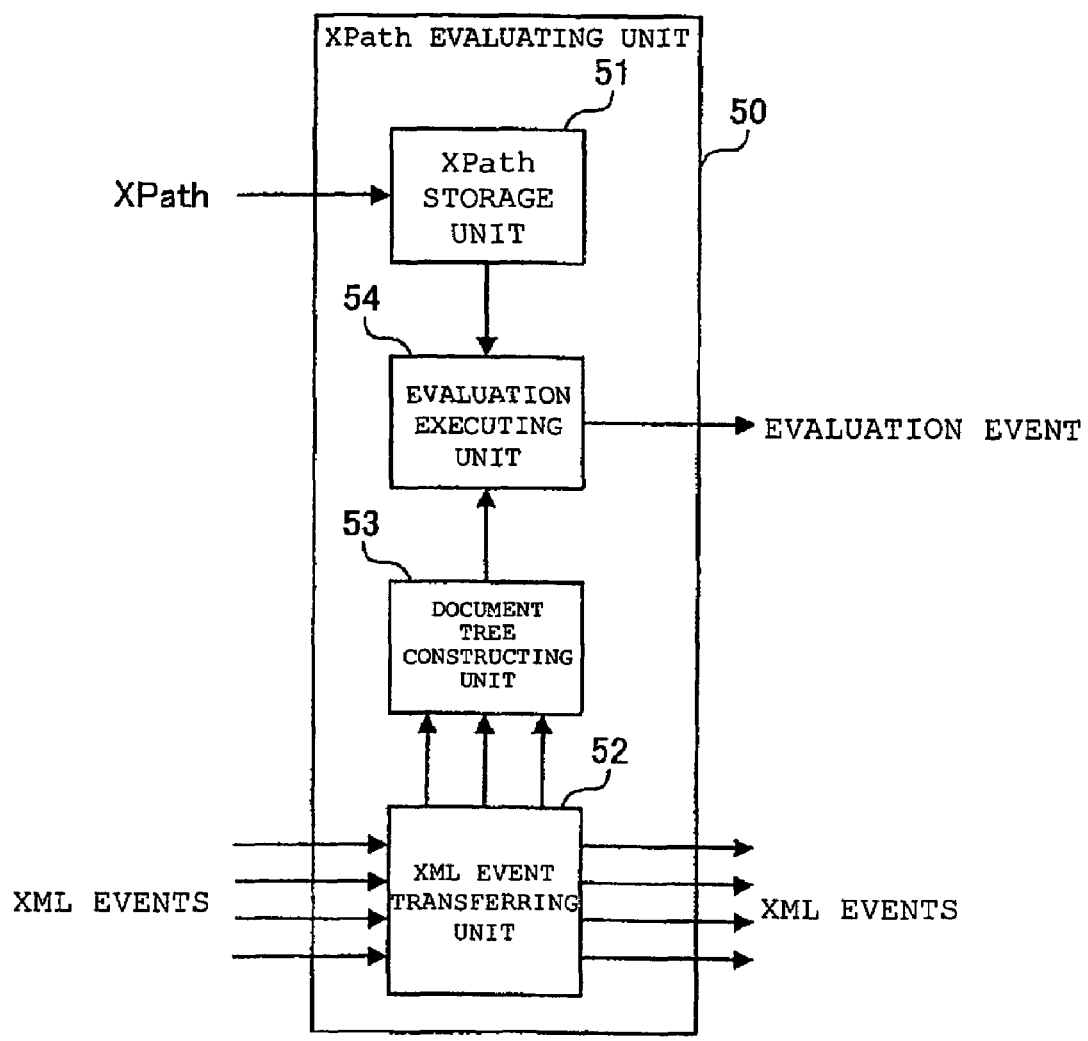
FIG. 22 is a view describing a functional configuration of an XPath evaluating unit in Embodiment 3.

FIG. 22 is a view showing a functional configuration of the XPath evaluating unit 50. As shown in FIG. 22, the XPath evaluating unit 50 of this embodiment includes an XPath storage unit 51, an XML event transferring unit 52, a document tree constructing unit 53, and an evaluation executing unit 54.

The XPath storage unit 51 is realized by the main memory 103 of the computer apparatus shown in FIG. 1, for example. The XPath storage unit 51 retains the XPath which has been provided in advance. The XML event transferring unit 52 inputs the XML events outputted from the XML parser 10, and then serially sends the XML events to the document tree constructing unit 53 depending on the nodes in the tree structure of the XML document. Moreover, the XML event transferring unit 52 serially transfers the XML events to the application executing unit 30 as well.

The document tree constructing unit 53 receives the XML events transferred from the XML event transferring unit 52, and constructs a document tree corresponding to the XML events which are transferred at the point of time. This document tree reflects the structure of the XML events obtained at the point of time. Accordingly, the document tree constitutes a subtree with respect to the document tree representing the structure of the entire XML document to be processed. Meanwhile, the document tree constructed in the event of obtaining the XML event strings to the end is identical to the document tree of the entire XML document.

Construction of the document tree is performed by adding a new node when a start tag token corresponding to an element of the XML document is inputted as an XML event. Moreover, when the node is added as a result of input of the start tag token, the node is regarded as an inserting position thereafter. Meanwhile, when an end tag token for the relevant element is inputted, a parent node of the node is regarded as the inserting position thereafter. Therefore, this document tree is updated every time when the document tree constructing unit 53 inputs an XML event.

The document tree which is constructed (updated) by the document tree constructing unit 53 is retained in the work area of the main memory 103 of FIG. 1, for example, and is used in the processing by the evaluation executing unit 54 to be described later.

When the above-described document tree is updated by the document tree constructing unit 53, the evaluation executing unit 54 evaluates the XPath retained in the XPath storage unit 51 by use of the document tree. Regarding a step evaluated as established as a result of evaluation of the XPath, the evaluation executing unit 54 of this embodiment saves information on a node of the document tree selected in the relevant step, that is, information on a result of partial evaluation of the XPath. This information is expressed as a set of tuples of a step ID and a node ID of each step {<sid1, nid1>, <sid1, nid2>, ... }. Such a set is referred to as a saved set. The saved set thus generated is retained in the work area of the main memory 103 of FIG. 1, for example.

In the saved set, the respective steps are numbered in order starting from number 1. Here, the 0th step is defined as a special step, and a root node is always saved so as to correspond to this step. Each node selected owing to the evaluation by the evaluation executing unit 54 is saved as a context node unless a node set selected in each subsequent step becomes empty.

Figure 23:
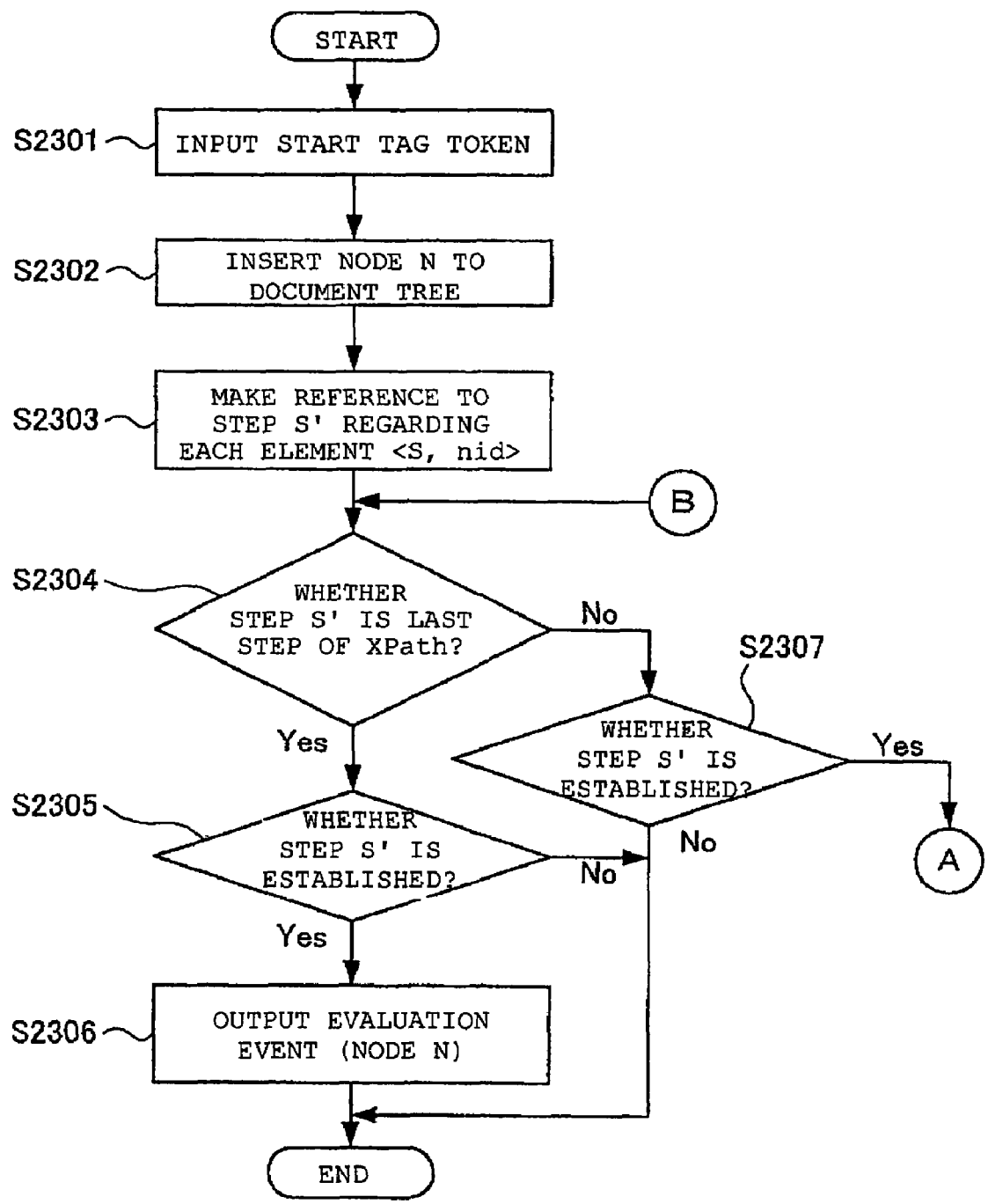
FIG. 23 is a flowchart showing procedures for evaluating the XPath by an evaluation executing unit of Embodiment 3 using a document tree and a saved set, which shows an operation when a start tag token is inputted as an XML event.
Figure 24:
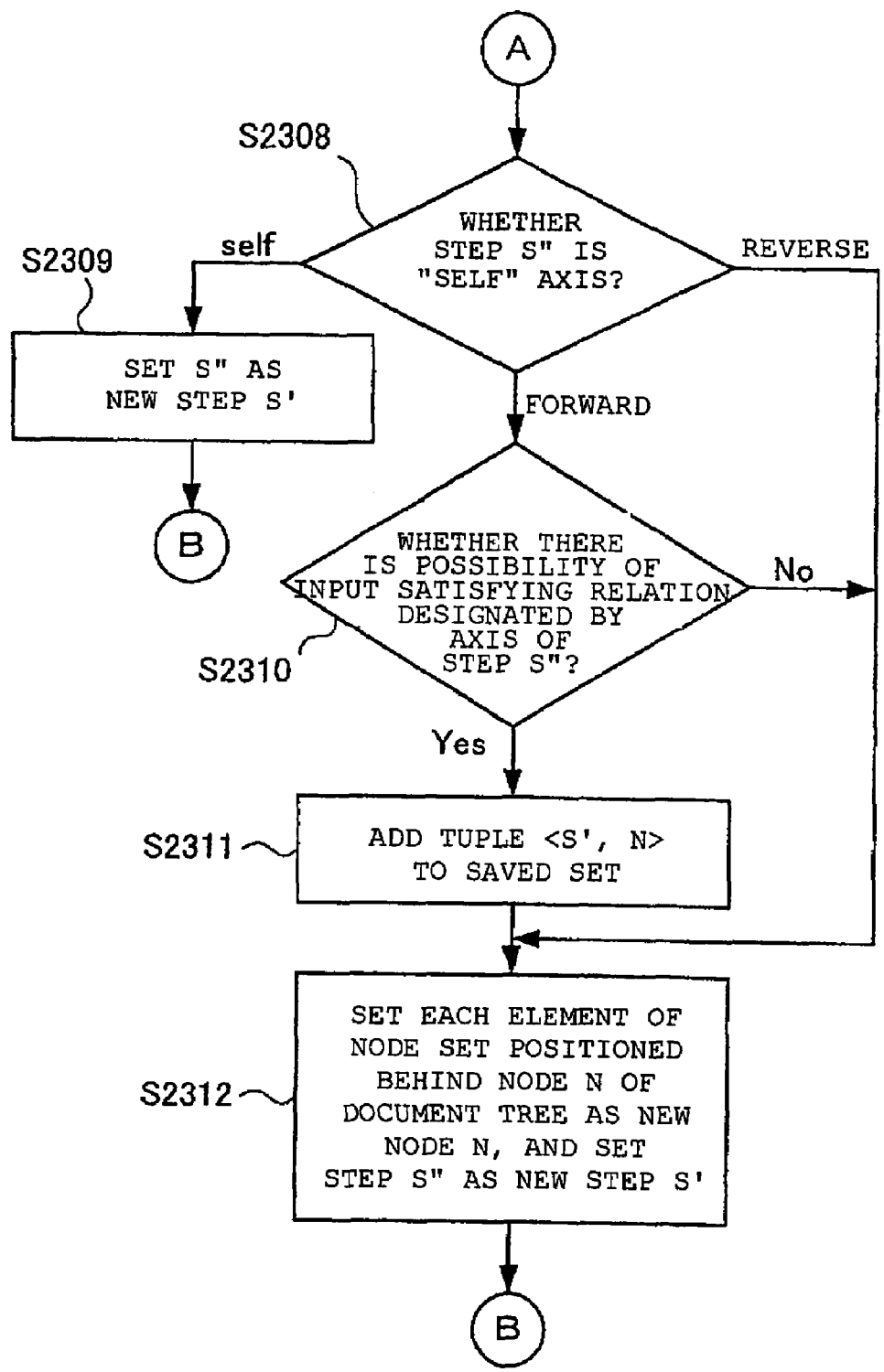
FIG. 24 is a flowchart showing the procedures for evaluating the XPath by the evaluation executing unit of Embodiment 3 using the document tree and the saved set, which shows the operation when the start tag token is inputted as the XML event.
Figure 25:
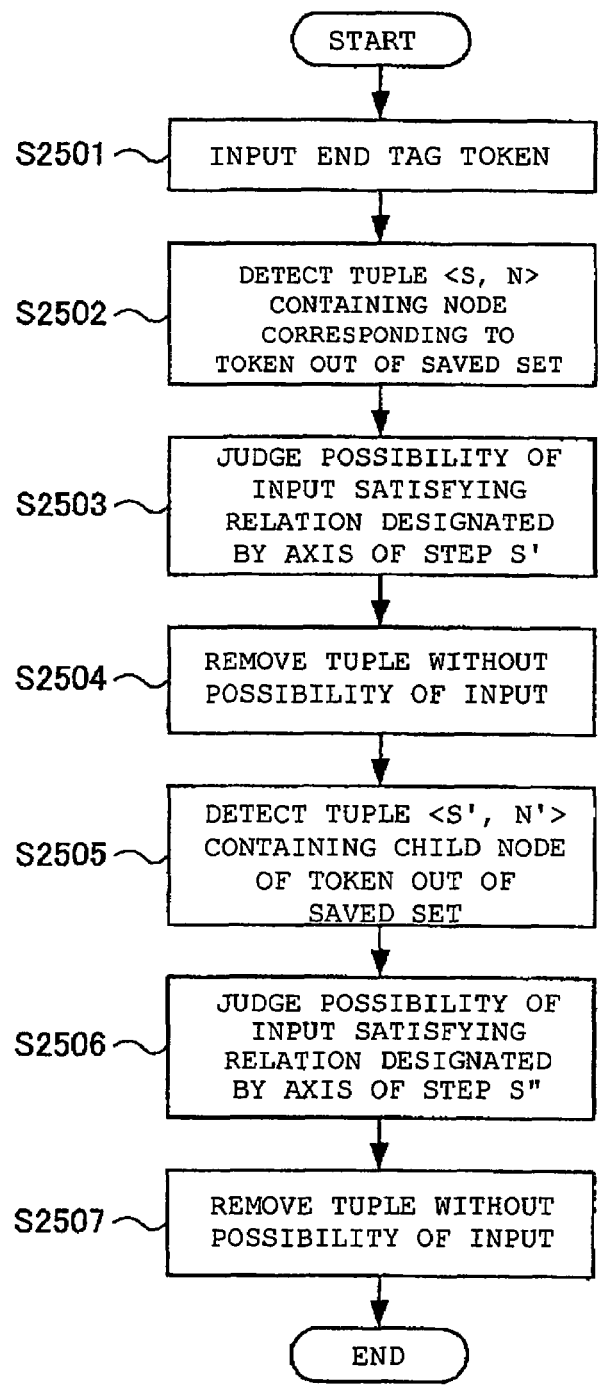
FIG. 25 is a flowchart showing procedures for evaluating the XPath by the evaluation executing unit of Embodiment 3 using the document tree and the saved set, which shows an operation when an end tag token is inputted as the XML event.

FIG. 23 to FIG. 25 are flowcharts showing procedures for evaluating the XPath by the evaluation executing unit 54 using the document tree and the saved set. FIGS. 23 and 24 show an operation when a start tag token is inputted as the XML event, and FIG. 25 shows an operation when an end tag token is inputted as the XML event. Here, for the purpose of facilitating explanation, the illustrated operations do not consider a predicate. Response to a predicate will be described later.

As shown in FIG. 23, when the start tag token is inputted as an XML event (Step 2301), the evaluation executing unit 54 inserts a node N corresponding to this element to a document tree which is constructed at the point of time (Step 2302). Initially, the node N is inserted with respect to the root node. Then regarding each element <S, nid> in the saved set, the following operation is performed with reference to a step S' which is numbered immediately subsequent to a step S (Step 2303).

The evaluation executing unit 54 checks whether the step S' is the last step of the location path (XPath) (Step 2304). When the Step S' is the last step, the evaluation executing unit 54 checks whether the evaluation of the step S' is established or not (Step 2305). If the evaluation is established, then the node N which was inserted lastly is the node addressed by the XPath. Accordingly, this node N is outputted as an evaluation result (Step 2306).

When the step S' is not the last step of the location path, the evaluation executing unit 54 checks whether the evaluation of the step S' is established or not (Step 2307). When the evaluation is established, the evaluation executing unit 54 further performs the following processing in response to an axis in a step S" which is subsequent to the step S'.

Note that when the evaluation of the step S' is not established by the judgments made in steps 2305 to 2307, the processing regarding the XML event is terminated and input of the next XML event is waited for.

As shown in FIG. 24, when the axis of the step S" is a "self" axis, the processing by the evaluation executing unit 54 returns to the judgment in Step 2304 while setting the step S" as the new step S' (Steps 2308 and 2309).

When the axis of the step S" is a forward axis such as "child" or "descendant", a judgment is made first as to whether there is a possibility of later input which satisfies a relation designated by the axis of the step S" while setting the node N as the context node (Steps 2308 and 2310). If there is a possibility of such input, a tuple (a set of the step ID and the node ID) <S', N> is added to the saved set (Step 2311). Then, each element in a node set positioned in the document order subsequent to the node N (inclusive of the node N in the case of the axis containing "self" (such as descendant-or-self)) in the document tree constructed at the point of time is set as the new node N, and the step S" is set as the new step S'. Then, the processing by the evaluation executing unit 54 returns to the judgment in Step 2304 (Step 2312).

When there is no possibility of input which satisfies the relation designated by the axis of the step S", each element in a node set positioned in the document order subsequent to the node N (inclusive of the node N in the case of the axis containing "self" (such as "descendant-or-self")) in the document tree constructed at the point of time is set as the new node N, and the step S" is set as the new step S' without adding the tuple <S', N> to the saved set. Then, the processing by the evaluation executing unit 54 returns to the judgment in Step 2304 (Steps 2310 and 2312).

When the axis of the step S" is a reverse axis such as "parent" or "ancestor", each element in a node set positioned in the document subsequent order to the node N (inclusive of the node N in the case of the axis containing "self" (such as "ancestor-or-self")) in the document tree constructed at the point of time is set as the new node N, and the step S" is set as the new step S'. Then, the processing by the evaluation executing unit 54 returns to the judgment in Step 2304 (Steps 2308 and 2312).

In the foregoing description, the evaluation executing unit 54 is designed to output the evaluation result when the XPath is established (see Step 2306). However, similar to Embodiments 1 and 2, it is also possible to design the evaluation executing unit 54 to output an evaluation result indicating establishment or non-establishment every time when each XML event is processed.

As shown in FIG. 25, when the end tag token is inputted as the XML event (Step 2501), the evaluation executing unit 54 detects a tuple <S, N> containing a node corresponding to the token out of the saved set (Step 2502). Next, concerning the detected tuple, a judgment is made as to whether there is a possibility of later input which satisfies a relation designated by the axis of the step S', which is numbered immediately subsequent to the step S, while setting the node N as the context node (Steps 2503). Then, the tuple without possibility of such input is removed from the saved set (Step 2504).

Thereafter, a tuple <S', N'> containing a child node of the token to be processed is detected out of the saved set (Step 2505). Next, concerning the detected tuple, a judgment is made as to whether there is a possibility of later input which satisfies a relation designated by the axis of the step S", which is numbered immediately subsequent to the step S', while setting the node N' as the context node (Steps 2506). Then, the tuple without possibility of such input is removed from the saved set (Step 2507).

Next, a description will be made regarding a predicate, which has been omitted in the operation described above. Upon evaluation of the nodes in the above-described operations, evaluation of the predicate is performed if the current sub tree has enough information to evaluate the predicate. Otherwise information, which indicates that the evaluation of the predicate has not been performed, is added to the node and the saved set. Then, the above-described operation is continued based on an assumption that the evaluation has been performed successfully. However, regarding a node which depends on a node on which the evaluation of the predicate is not completed, output of such a node will be withheld. Evaluation of an element in the saved set, whose the predicate is not evaluated, will be carried out at a time point when conditions for the evaluation of the predicate are fulfilled by subsequent input. When the location path is used as the predicate, the object of evaluation is changed to evaluation of the predicate, and the processing described in FIG. 23 to FIG. 25 is applied thereto.

When the evaluation of the predicate is performed successfully at last, the node depending on the success in the evaluation is outputted as an evaluation result. On the contrary, when the evaluation is failed, the relevant node is removed from the saved set, and all the operations performed on the assumption of the success in the evaluation of the node are canceled.

Next, a description will be made regarding the evaluation of the XPath according to this embodiment based on a concrete example.

Figure 26:
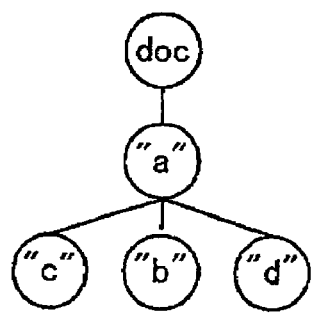
FIG. 26 shows an XML document to be processed, SAX event strings thereof, and the document tree constructed in this embodiment; 1

FIG. 26 is a view showing an XML document to be processed, SAX event strings thereof, and a document tree.

An assumption is made herein that the following XPath is provided to the XPath evaluating unit 50:

/a/b/preceding-sibling::c/following-sibling::d

That is, this XPath is evaluated successfully upon detection of a sibling node d subsequent to a sibling node c that is precedent to a node b being a child node of a node a.

FIG. 27 to FIG. 36 show the SAX event strings with respect to the XML document of FIG. 26, the document tree corresponding thereto, and aspects of transition of the saved set obtained by the evaluation of the XPath using the document tree in a sequential order.

Figure 27:
FIG. 27 shows an aspect of a SAX event string, a document tree, and transition of a saved set with respect to an XML document, which shows the aspect when a SAX event "startDocument" is inputted.
Figure 28:
FIG. 28 shows an aspect of SAX event strings, the document tree, and transition of the saved set with respect to the XML document, which shows the aspect when a SAX event "startElement: "a"" is inputted.

To begin with, a SAX event "startDocument" indicating a start of a document is inputted, and a root node "doc" is constructed as a document tree corresponding thereto (FIG. 27). A tuple (a set of a step ID and a node ID) <0, doc> is inputted to the saved set. Subsequently, a SAX event "startElement: "a"" indicating a start of an element (a node) is inputted, and a child node "a" is added to the root node "doc" (FIG. 28). Meanwhile, since a step 1 of the XPath is established, a tuple <1, "a"> is inputted to the saved set.

Figure 29:
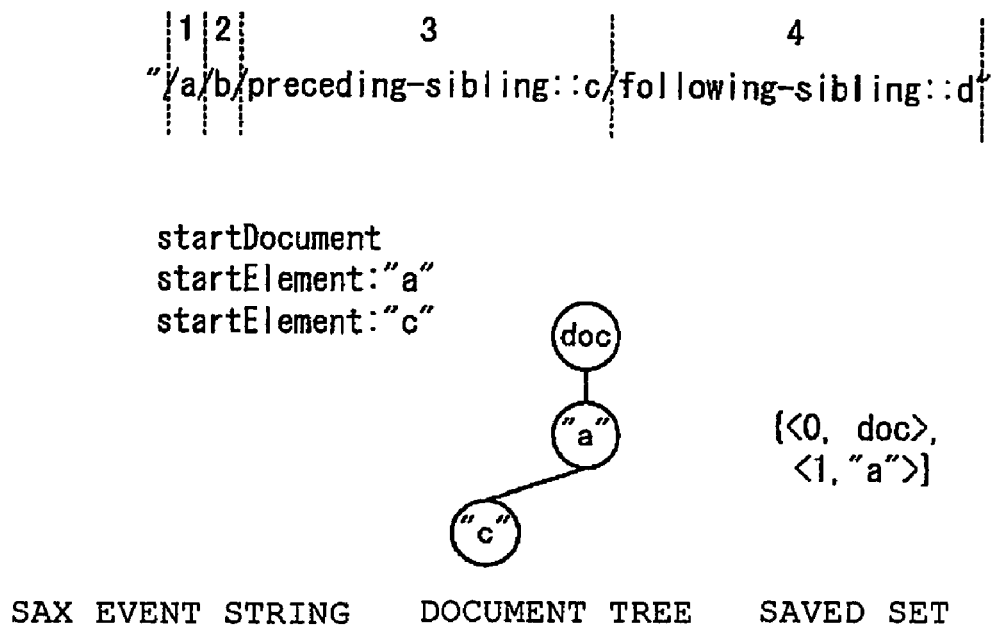
FIG. 29 shows an aspect of SAX event strings, the document tree, and transition of the saved set with respect to the XML document, which shows the aspect when a SAX event "startElement: "c"" is inputted.
Figure 30:
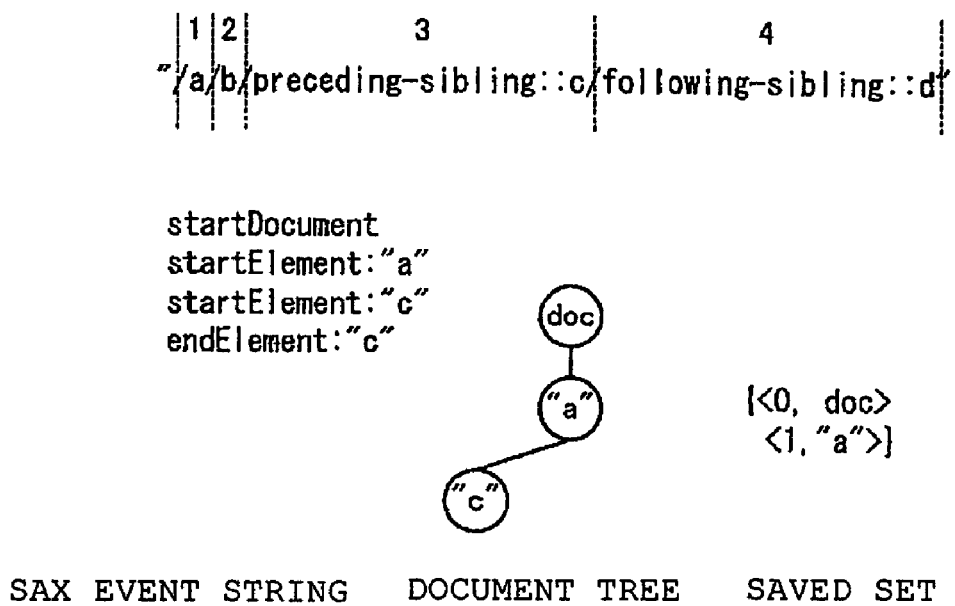
FIG. 30 shows an aspect of SAX event strings, the document tree, and transition of the saved set with respect to the XML document, which shows the aspect when a SAX event "endElement: "c"" is inputted.

Next, a SAX event "startElement: "c"" is inputted and a child node "c" is added to the node "a" (FIG. 29). Subsequently, a SAX event "endElement: "c"" indicating an end of the element is inputted (FIG. 30). Next, when a SAX event "startElement: "b"" is inputted, a child node "b" is added to the node "a" (FIG. 31). In this event, a step 2 of the XPath is established by generation of the node "b" and a step 3 of a reverse axis (preceding-sibling) is immediately established.

Therefore, a tuple concerning the step 2 is not retained in the saved set and a tuple <3, "c"> concerning the step 3 is inputted to the saved set instead.

Thereafter, a SAX event "endElement: "b"" is inputted (FIG. 32). Subsequently, when a SAX event "startElement: "d"" is inputted, a child node "d" is added to the node "a" (FIG. 33). In this event, a step 4 (the last step) of the XPath is established by generation of the node "d", and the XPath is thereby evaluated as established. Therefore, the node "d" is outputted from the evaluation executing unit 54 of the XPath evaluating unit 50 to the application executing unit 30 as an evaluation event (see Step 2306 in FIG. 23).

Thereafter, a SAX event "endElement: "d"" is inputted (FIG. 34), and a SAX event "endElement: "a"" is inputted subsequently. Since there is no possibility that a new child node is added to the node "a", the tuple <1, "a"> of the step 1 is removed from the saved set (FIG. 35; see Steps 2503 and 2504 in FIG. 25). Furthermore, a SAX event "endDocument" indicating an end of the document is inputted, whereby the input of the event strings of the XML document subject to processing is completed (FIG. 36).

Figure 37:
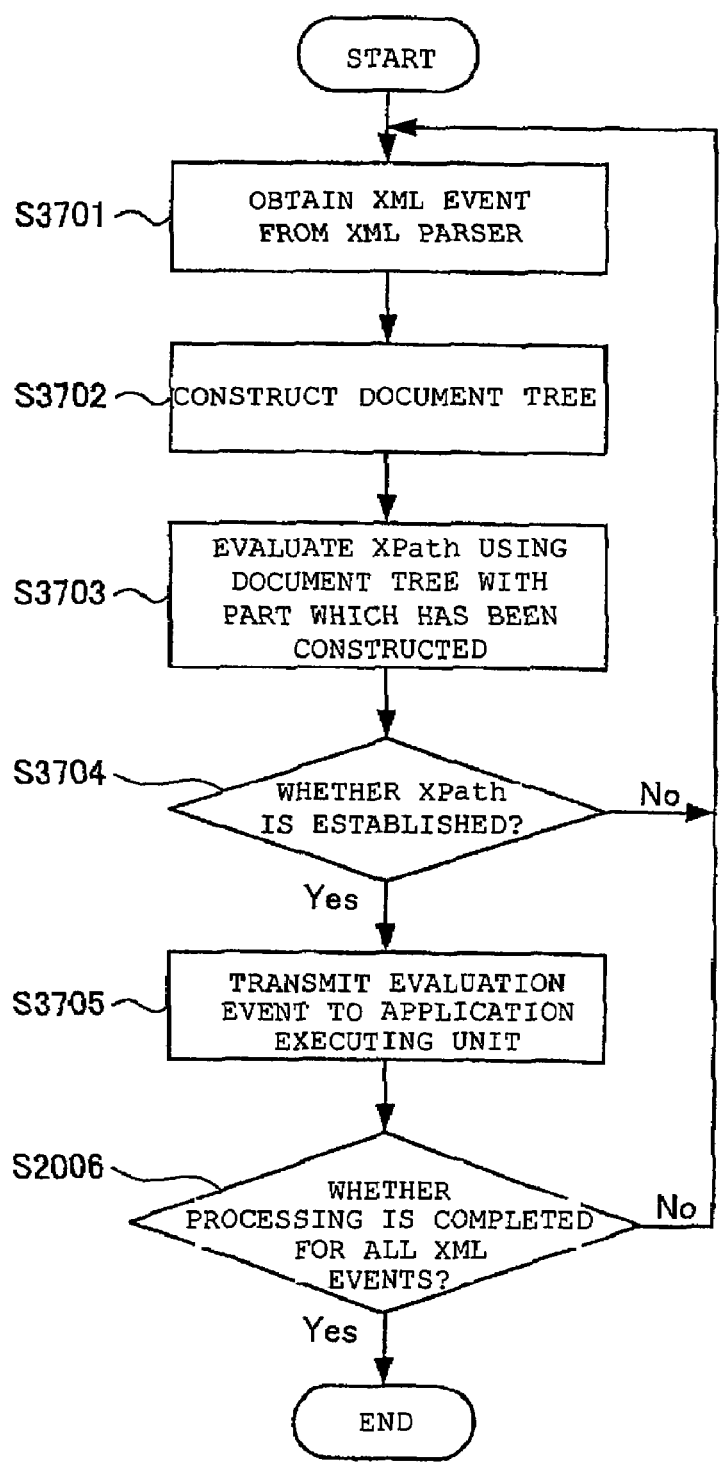
FIG. 37 is a flowchart describing streaming processing of the XML document according to Embodiment 3.

FIG. 37 is a flowchart which explains streaming processing of an XML document according to this embodiment. As shown in FIG. 37, when the XML document to be processed is inputted and the XML events are sent from the XML server 10 (Step 3701), the XPath evaluating unit 50 firstly constructs a document tree based on the obtained XML events (Step 3702). This document tree is updated every time an XML document is inputted in order and is eventually constructed into the document tree which corresponds to the document structure of the XML document to be processed. Then, the XPath is evaluated by the evaluation executing unit 54 of the XPath executing unit 50 by use of this document tree, and the information concerning partially established portions (steps) are accumulated in the saved set as necessary (Step 3703). Then, the input of the XML events, the construction of the document tree, and the evaluation of the XPath are repeated until the entire XPath is established. When the entire XPath is evaluated as established, the evaluation event is sent to the application executing unit 30 (Steps 3704 and 3705).

The application executing unit 30 obtains the XML events outputted from the XML parser 10 and the evaluation event outputted from the evaluation executing unit 54 of the XPath evaluating unit 50. The application executing unit 30 serially processes the XML events in accordance with the evaluation event.

When all the processing from Steps 3701 to 3705 is executed for all the XML events regarding the XML document to be processed which are sent from the XML parser 10, the streaming processing of the XML document according to this embodiment is completed (Step 3706).

The present invention has been described with the foregoing three embodiments. In these embodiments, the partial evaluation of the XPath is serially performed with respect to the XML event strings which are inputted in the streaming format, and the information concerning the partial evaluation is accumulated, whereby the evaluation result of the entire XPath is eventually obtained.

In Embodiments 1 and 2, the XPath is converted into the data structure so that partial evaluation can be performed in response to the XML event strings according to the streaming format, and then the evaluation is serially performed in response to the input of the respective XML events. On the other hand, in Embodiment 3, the document tree of the XML document is constructed while inputting the XML event strings in the streaming format, and the XPath is evaluated sequentially by use of this document tree.

In Embodiments 1 and 2, the evaluation concerning the step of the reverse axis is only possible under a very limited condition because information concerning the XML events which have been evaluated is lost after the evaluation. On the contrary, in Embodiment 3, there is no limitation for the evaluation concerning the step of the reverse axis because the information on the XML event which have been evaluated is preserved as the document tree even after the evaluation.

Moreover, in any of the Embodiments 1 to 3, when a judgment is made that the XPath is established before inputting all the XML event strings, it is possible to start processing by the application executing unit 30 at that point (the streaming processing). However, there is a possibility in Embodiment 3 that a time difference is caused between notification of the XML event and notification of the evaluation event if the XPath includes a step of reverse axis. Moreover, the notification of the evaluation event is not always performed in accordance with the document order (the order of initial letters in XML expression of the respective nodes which appear in the XML expressions of the document) in this case. Therefore, attention is required when the processing by the application executing unit 30 is the one that changes the processing of the XML event in accordance with the evaluation event. Embodiments 1 and 2 do not have such limitation.

Therefore, Embodiment 1 or 2 is applied when the XPath does not include a step of a reverse axis. Even when the XPath includes a step of a reverse axis, it is also possible to use Embodiment 3 if the processing by the application executing unit 30 is not the one that changes the processing of the XML event in accordance with the evaluation event. Also, if the processing by the application executing unit 30 is the one that changes the processing of the XML event in accordance with the evaluation event, as long as a delay in the processing is allowed, the Embodiment 3 can be used. Such a choice of method becomes possible.

In Embodiment 2, the inputted XML event strings are directly stored into the stack as the string information and are just compared with the contents of storage in the stack for expressing the XPath. Accordingly, Embodiment 2 requires very small memory usage and short time for processing. Moreover, Embodiment 2 can be implemented relatively easily. Therefore, when any of the embodiments is applicable, it is preferable to use Embodiment 2.

It is needless to say that the technical scope of the present invention will not be limited to the above-described three embodiments, and that the present invention includes various modifications which are identical in terms of the technical idea thereof.

As described above, according to the present invention, it is possible to realize an analyzing system and an analyzing method for evaluating the XPath while subjecting an XML document to streaming processing.

Although the preferred embodiments of the present invention have been described in detail, it should be understood that various changes, substitutions, and alternations can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An extensible-markup-language Path Language (XPath) evaluating method comprising evaluating the XPath relevant to an extensible-markup-language (XML) document by use of a computer, said step of evaluating being carried out individually concerning inputted XML events, while subjecting the XML document to streaming processing, the step of evaluating XPath comprising:
   a first step of serially inputting XML event strings constituting an XML document to be processed;
   a second step of serially evaluating the XPath respectively relevant to the inputted XML events while subjecting the XML document to streaming processing and retaining information concerning a result of partial evaluation of the XPath in given storing means when the XPath is partially established with respect to a given XML event;
   a third step of repeating the partial evaluation of the XPath along with the input of the XML event strings while considering the result of the partial evaluation retained in the storing means and evaluating that the XPath is established with respect to the XML document when the last part of the XPath is established; and
   judging establishment of the entire XPath while accumulating results of said partial evaluation enabling evaluation of the XPath by use of said streaming processing
   wherein the second step includes the steps of:
   generating an automaton for expressing the XPath to be evaluated; and
   evaluating the XPath partially by allowing transition of a state of the automaton based on inputted respective XML events and retaining a result of the partial evaluation as the state of the automaton;
   wherein the second step includes the steps of:
   generating a first stack which expresses the XPath to be evaluated with a string of stack elements; and
   generating a second stack for analyzing a nested structure of the XML document to be processed based on respective inputted XML events and then evaluating the XPath partially by comparing the first stack with the second stack; and
   wherein the second step includes the steps of:
   serially constructing a document tree indicating a document structure of the XML document to be processed based on input of respective XML events; and
   evaluating the XPath along with construction of the document tree by use of the document tree including a part which has been constructed.

2. A program embodied in a program storage device readable by machine, tangibly embodying a program of instructions, and employed for controlling a computer to evaluate the XPath with respect to an XML document, the program causing the computer to execute the procedures for carrying out the steps of claim 1.

3. A computer-readable recording medium comprising the program according to claim 2.

4. An article of manufacture comprising a program storage device readable by machine, tangibly embodying a program of instructions for causing evaluation of the XPath relevant to an extensible-markup-language (XML) document, the program of instructions in said article of manufacture for causing a computer to effect the steps of claim 1.

5. A program storage device readable by machine, tangibly embodying a program of instructions executable by the machine to perform method steps for evaluating the XPath relevant to an extensible-markup-language (XML) document, said method steps comprising the steps of claim 1.

6. An XPath evaluating apparatus comprising:
   an evaluation executing unit being embodied in a program storage device and executed by a processor, readable by machine, tangibly embodying a program of instructions tangible computer readable medium, and employed for inputting XML event strings constituting an XML document and serially evaluating the XPath with respect to each of XML events while subjecting the XML document to streaming processing, said serially evaluating being carried out individually concerning inputted XML events, while subjecting the XML document to streaming processing, and while retaining information concerning a result of partial evaluation of the XPath when the XPath is partially established with respect to a given XML event, and evaluating that the XPath is established with respect to the XML document when the last step of the XPath is established;

an XML event transferring unit being embodied in a program storage device and executed by a processor, readable by machine, tangibly embodying a program of instructions tangible computer readable medium, and employed for inputting the XML event strings constituting the XML document to be processed and serially transferring the XML event strings to the evaluation executing unit; and a judging unit judging establishment of the entire XPath while accumulating results of said partial evaluation enabling evaluation of the XPath by use of said streaming processing an automaton generating unit being embodied in a program storage device and executed by a processor, readable by machine, tangibly embodying a program of instructions tangible computer readable medium, and employed for generating an automaton which expresses the XPath to be evaluated, wherein the evaluation executing unit performs partial evaluation of the XPath by allowing a state of the automaton generated by the automaton generating unit to perform transition based on the XML events transferred from the XML event transferring unit, and retains a result of the partial evaluation as the state of the automaton;

a stack generating unit being embodied in a program storage device and executed by a processor, readable by machine, tangibly embodying a program of instructions tangible computer readable medium, and employed for generating a first stack which expresses the XPath to be evaluated with a string of stack elements, wherein the evaluation executing unit performs partial evaluation of the XPath by generating a second stack for analyzing a nested structure of the XML document subject to processing based on the XML events transferred from the XML event transferring unit and then comparing the first stack generated by the stack generating unit with the second stack.

7. A computer program product comprising a program storage device and executed by a processor, readable by machine, tangibly embodying a program of instructions the program of instructions for causing a computer to effect the Xpath evaluating apparatus of claim 6.

* * * * *